US009934695B2

(12) United States Patent
Shustorovich et al.

(10) Patent No.: US 9,934,695 B2
(45) Date of Patent: Apr. 3, 2018

(54) SYSTEM, APPARATUS AND METHOD FOR EDUCATION THROUGH INTERACTIVE ILLUSTRATION

(75) Inventors: Alexander Shustorovich, New York, NY (US); Olga Zakharova, Moscow (RU); Natalia Churakova, Moscow (RU)

(73) Assignee: PLEIADES PUBLISHING LIMITED, New York, NY (US)

( * ) Notice: Subject to any disclaimer, the term of this patent is extended or adjusted under 35 U.S.C. 154(b) by 255 days.

(21) Appl. No.: 13/340,397

(22) Filed: Dec. 29, 2011

(65) Prior Publication Data

US 2013/0084557 A1    Apr. 4, 2013

Related U.S. Application Data

(60) Provisional application No. 61/540,838, filed on Sep. 29, 2011.

(51) Int. Cl.
*G09B 5/02* (2006.01)
*G09B 5/00* (2006.01)
*G09B 7/00* (2006.01)

(52) U.S. Cl.
CPC .................... *G09B 5/00* (2013.01); *G09B 7/00* (2013.01)

(58) Field of Classification Search
CPC ...................................................... G09B 11/10
USPC ........................................... 434/365, 81–105
See application file for complete search history.

(56) References Cited

U.S. PATENT DOCUMENTS

| | | | |
|---|---|---|---|
| 5,267,865 A * | 12/1993 | Lee et al. | 434/350 |
| 6,527,556 B1 * | 3/2003 | Koskinen | 434/219 |
| 6,944,624 B2 | 9/2005 | Orton et al. | |
| 7,029,280 B2 * | 4/2006 | Krebs et al. | 434/118 |
| 2001/0038999 A1 * | 11/2001 | Hainey, II | 434/85 |
| 2002/0107681 A1 | 8/2002 | Goodkovsky | |
| 2002/0187463 A1 | 12/2002 | Aspe et al. | |
| 2002/0188477 A1 | 12/2002 | Ackermann et al. | |
| 2003/0152904 A1 * | 8/2003 | Doty, Jr. | 434/350 |
| 2003/0232315 A1 | 12/2003 | Pfund | |
| 2004/0039987 A1 * | 2/2004 | Coppin et al. | 715/502 |
| 2005/0019740 A1 * | 1/2005 | Cunningham et al. | 434/350 |
| 2005/0181349 A1 * | 8/2005 | Bardige et al. | 434/362 |

(Continued)

OTHER PUBLICATIONS

International Search Report for PCT Patent Application No. US2012/024568 dated May 23, 2012, 11 pages.

*Primary Examiner* — Thomas Hong
(74) *Attorney, Agent, or Firm* — Amin, Turocy & Watson, LLP

(57) ABSTRACT

Systems, methods, and apparatus are described herein that facilitate education through an interactive illustration. The systems, methods and apparatuses can facilitate both the design of a course employing the interactive illustration at an instructor interface and education utilizing the course at an educational terminal. The design of the course can be based on a selection of an image, a selection of an activity, a selection of a development level of a student and selection of a work stage. The same image can be utilized for different activities, development levels and work stages. Additionally, tools utilized with the interactive image can be the same for different images, activities, development levels and work stages. The tools can also be the same for the design of the course and the study utilizing the course.

20 Claims, 23 Drawing Sheets

(56) References Cited

U.S. PATENT DOCUMENTS

| | | | |
|---|---|---|---|
| 2007/0209004 A1* | 9/2007 | Layard | G06F 17/3089 715/731 |
| 2008/0176192 A1* | 7/2008 | Redd et al. | 434/118 |
| 2009/0113091 A1* | 4/2009 | Miller et al. | 710/64 |
| 2010/0156913 A1* | 6/2010 | Ortega | G06F 3/1438 345/520 |
| 2010/0167255 A1* | 7/2010 | Shane et al. | 434/307 R |
| 2011/0104653 A1* | 5/2011 | Rogers et al. | 434/350 |

* cited by examiner

SYSTEM, APPARATUS AND METHOD FOR EDUCATION THROUGH INTERACTIVE ILLUSTRATION

PRIORITY CLAIM

This application claims priority to U.S. Provisional Patent Application Ser. No. 61/540,838, filed on Sep. 29, 2011, entitled "The Interactive Illustration as a vehicle for Esthetic Education of School and College Students." The entirety of the aforementioned application is incorporated by reference herein.

TECHNICAL FIELD

This disclosure relates generally to electronic teaching technologies employing interactive illustrations.

BACKGROUND

Electronic resources play a central role in education. Teachers can utilize these electronic resources as teaching tools; teachers can also utilize these electronic resources as testing resources to measure students' progress. However, these electronic resources are often subject-specific so that a teacher would need to employ multiple electronic resources to cover different subjects. These resources can employ different controls, which can create a steep learning curve for the teacher and students alike.

The above-described deficiencies of today's educational and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject innovations. Its sole purpose is to present some concepts of the disclosed subject matter in a simplified form as a prelude to the more detailed description presented later.

To correct for at least the above noted deficiencies and other drawbacks of conventional electronic educational resources, systems, methods and apparatuses are described herein that can provide an interactive illustration for electronic education; the interactive illustration can employ the same tools for various subjects, educational levels and work activities eliminating the need for different resources for different subjects, educational levels and work activities, thereby eliminating the steep learning curve.

According to an embodiment, described herein is a system that can provide an educational resource. The system can include an instrument component that can display a plurality of tools related to an interactive illustration on an instructor interface to facilitate design of a course. The instrument component can display the same plurality of tools on an educational terminal to facilitate study with the course. The system can also include an image component that can display an image selected from a plurality of images on the instructor interface. The instructor can create the interactive image from the image and the tools. The image can also be displayed on the educational terminal by the image component to facilitate study with the course. The system can also include a course selection component that includes an image selection component that can display a plurality of images on the instructor image to facilitate selection of the image that will be utilized in the interactive illustration. The course selection component can also include an activity selection component that can facilitate selection of a subject area for the course (e.g., historical-cultural studies or art criticism). The course selection component can also include a level selection component that can facilitate selection of an educational level for the course; this educational level can be tailored for each user of the educational terminal. The course selection component can also include a work stage selection component that can facilitate selection of an educational goal or testing area of the course.

According to another embodiment, described herein is a method that can be utilized to provide an educational resource. The method can include configuring a course that utilizes an interactive image. The course can be configured according to a selection of an image, a selection of an activity, a selection of a development level, and a selection of a work stage. The tools utilized to manipulate the images can remain the same regardless of the activity, the development level or the work stage. Additionally the plurality of images can also remain the same regardless of the activity, the development level or the work stage. The interactive image and associated tools can be displayed on the instructor interface and/or the educational terminal so that the instructor and the student can manipulate the interactive image according to the same tools.

Many different apparatuses can be utilized to perform the methods described herein and to implement the systems described herein. For example, computer readable storage media and/or any digital device that can facilitate execution of instructions stored on a computer-readable storage medium are conceived within the scope of this specification.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
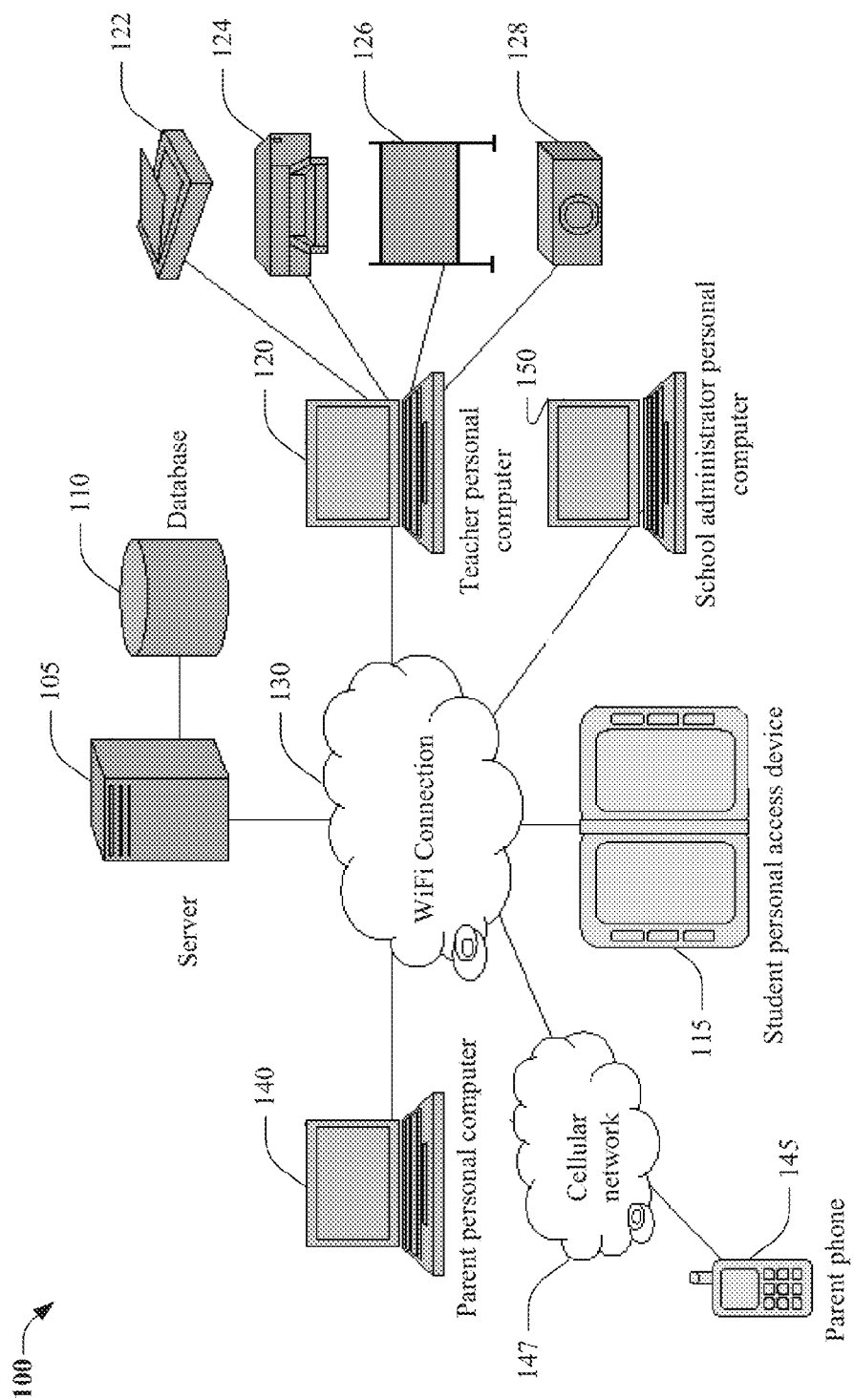
FIG. 1 illustrates an educational system, in accordance with an embodiment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Described herein are various embodiments that can facilitate education through an interactive illustration. The embodiments can facilitate the design of a course employing the interactive illustration at an instructor interface. The embodiments can also facilitate education utilizing the course at an educational terminal. The same manipulation tools can be utilized at both the instructor interface to design the course and the educational terminal to facilitate learning tasks.

When designing a course, an instructor can choose an illustration, a subject or activity, a developmental level of an individual student, and a work stage. Within the interactive illustration, the same image can be utilized for different subjects or activities, development levels and work stages. Additionally, tools utilized to create and manipulate the interactive image can be the same for the design of the course and the study utilizing the course.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As utilized herein, terms "component," "system," "platform," "node," "layer," "selector," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The computer readable media can be a non-transitory computer readable storage medium. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive); and/or a virtual device that emulates a storage device and/or any of the above computer-readable media.

Referring now to FIG. 1, illustrated is a system 100 for creating and utilizing an interactive illustration. An "illustration" as described herein refers to any illustration, such as a pictorial work, graphic work, photographic work, or the like, of interest for study, research and other educational purposes. The system 100 can include illustration component 102 that can be provided to an instructor interface 104 and any number of educational terminals 106. Although only one instructor interface 104 is shown for simplicity of illustration, it will be understood that any number of instructor interfaces can be provided with the illustration component 102.

The illustration component 102 can facilitate the design of a course utilizing the interactive illustration. An instructor utilizing the instructor interface 104 can design a course (e.g., utilizing a demo part of the interactive illustration) employing the illustration component 102. The instructor can utilize interactive instruments, such as a vertical frame, a horizontal frame or the like, to highlight aspects or fragments of an illustration that will be the subject matter of the course for education (e.g., study, research, or the like). The instructor can utilize other interactive instruments, such as a circular frame, a magnifying utility, or the like, for concentrating attention on features or details that can help specify or confirm the unfolding logic or research.

The course can be provided to one or more students (e.g., utilizing an educational part of the interactive illustration) to facilitate learning through the interactive illustration. The students can utilize the same set of interactive instruments as the instructor, such as the vertical frame, the horizontal frame, the circular frame, or the like, to complete various tasks. Examples of tasks can include: finding and highlighting various fragments in an illustration guided by a description or name given in the task or by independently chosen aspects of analysis, as well as expressive details, which can be utilized to confirm the student's impression or opinion.

The results of the student's activities can be checked automatically to facilitate instant feedback about the student's academic progress. This feedback can be provided to the student, to parents, to the teacher or to anyone else authorized to receive such results in the educational environment 200, as illustrated in FIG. 2.

Figure 2:
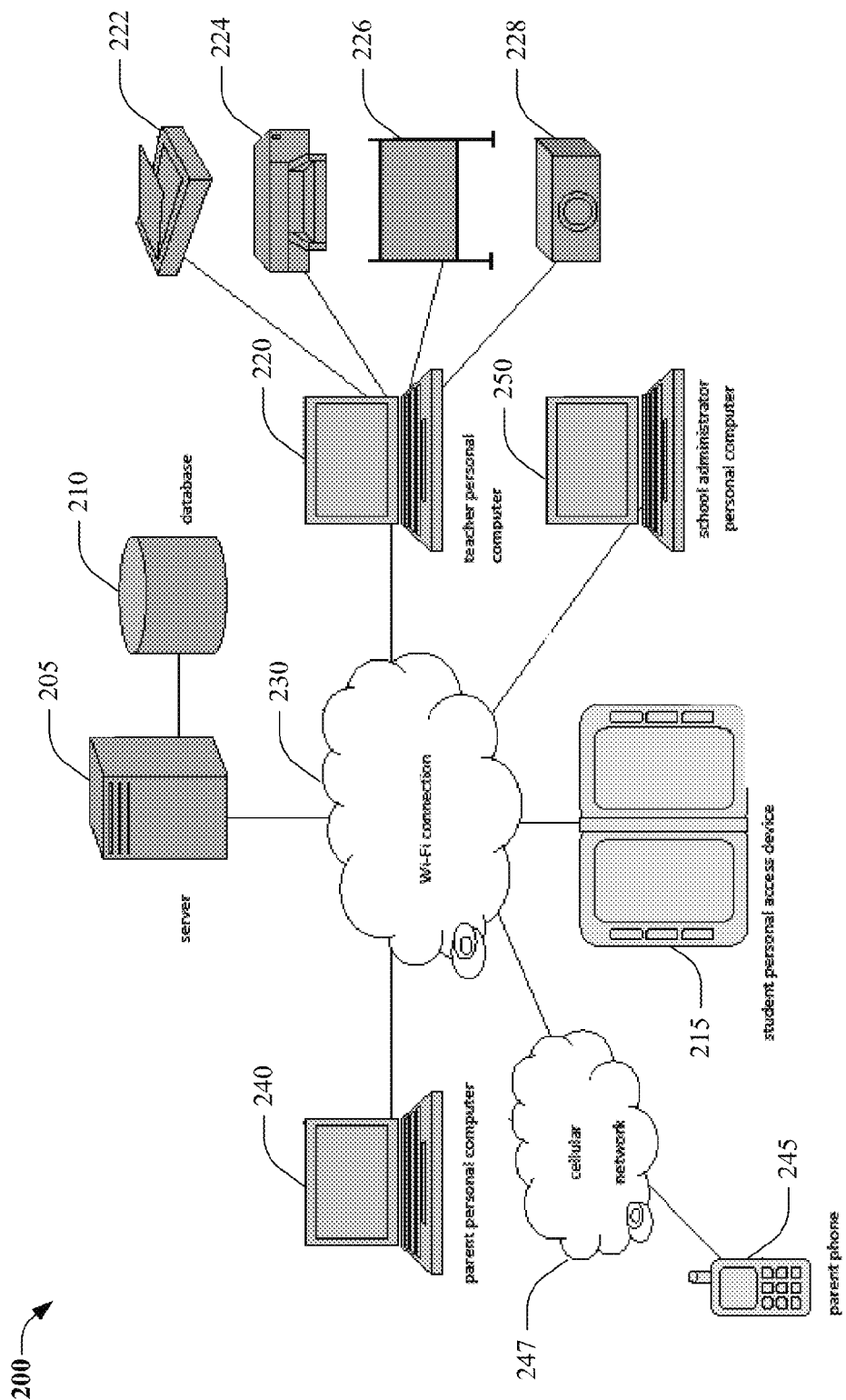
FIG. 2 illustrates an educational environment, in accordance with an embodiment.

FIG. 2 is a schematic illustration of an educational environment 200. Server 205 can couple to database 210 (forming, for example, illustration component 102). Database 210 can store various illustrations that can be utilized in connection with the illustration component 102. The database 210 and can be accessed via Internet 230, e.g., via a Wi-Fi connection, a local area network (LAN) (not shown), a cloud computing environment (not shown), etc.

Illustration component 102 can be accessed via Internet 230, from student personal access device 215 (e.g., educational terminal 106), teacher personal computer 220 (e.g., instructor interface 104); school administrator personal computer 250; and parent personal computer 240. Further, as illustrated by FIG. 2, educational component 110 can be accessed from a parent phone 245 via a cellular network 247. For example, if authorized, the teacher, student, school administrator, and the parent can receive instant feedback about the student's academic progress in relation to the interactive illustration and/or the course.

Student personal access device 215 can include a computing device with two sensor screens, e.g., which can present pages of an electronic textbook, and/or receive student responses entered, for example, from a virtual keyboard, stylus, etc. Further, student personal access device 215 can convert student input, e.g., notes, answers, drawings, graphs, diagrams, sketches, etc. detected by input device(s), the sensor screens, etc. of student personal access device 215, e.g., into information, e.g., text and/or images, etc. that can be communicated to educational component 110 and/or instructor interface 130.

Teacher personal computer 220 can collect such information, e.g., received from student personal access device 215, received from educational component 110, etc. and perform initial processing, lesson plan selection, etc. based on the collected information. Further, teacher personal computer 220 can utilize various peripherals, e.g., a scanner 222, a printer 224, an electronic board 226, a projector 228, etc. to enhance classroom instruction, e.g., in response to the collected information.

In an aspect, a teacher, via teacher personal computer 220, can assign students to customized courses (e.g., designed via illustration component 102) specific to their educational level. During a class, each student, utilizing his/her student personal access device 215, can engage in educational tasks via the assigned course, e.g., on a color screen, and/or review information during his/her independent work along his/her assigned educational path. The same course can be provided to multiple student personal access devices 215, for example for group work.

Figure 3:
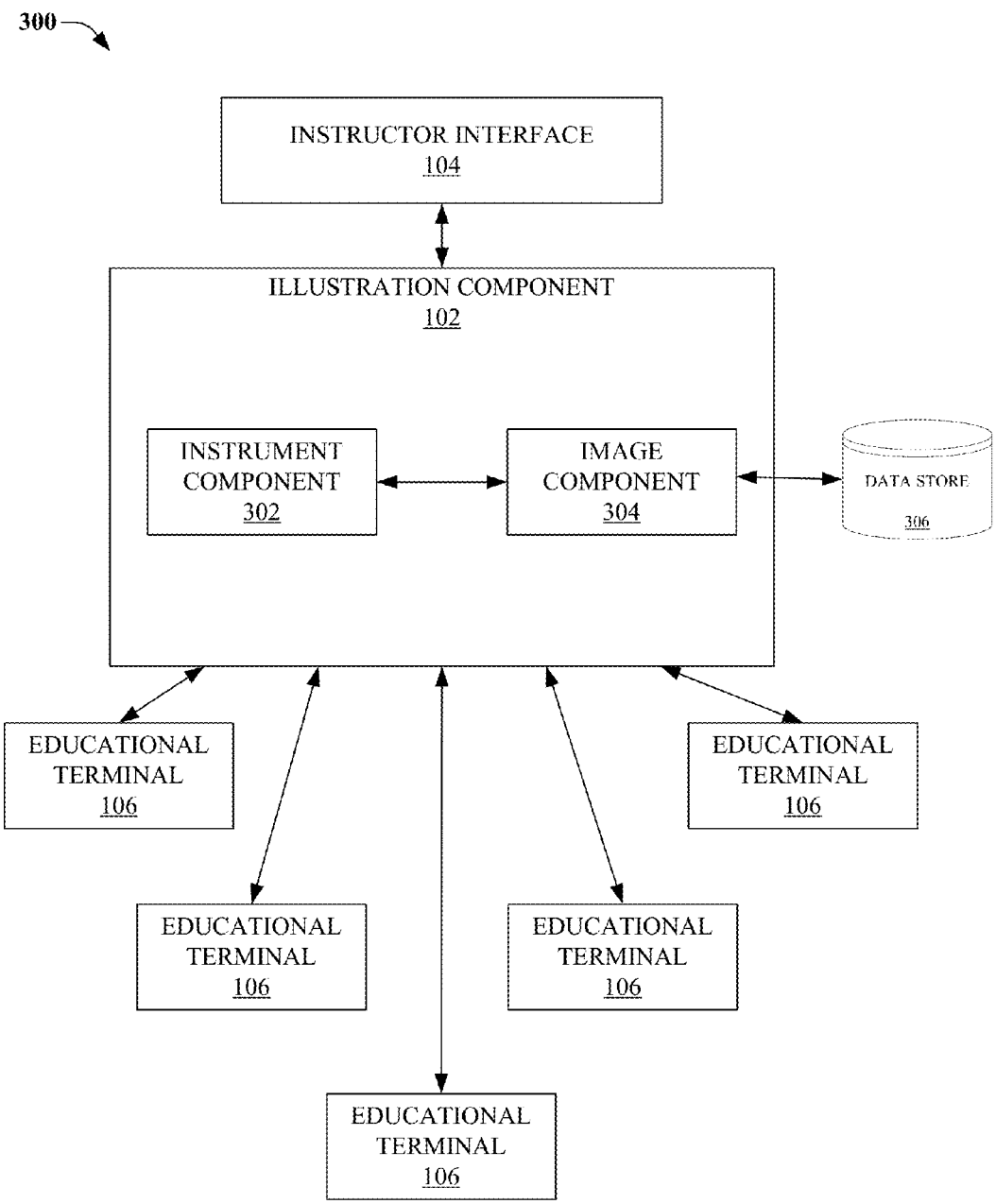
FIG. 3 illustrates an educational system, in accordance with another embodiment.

Referring now to FIG. 3, illustrated is a system 300 that can facilitate education through interactive illustrations. The illustration component 102 can include an instrument component 302 and an image component 302 that can facilitate design and use of a specific course utilizing an interactive illustration. The "course" can include work within any number of hours in a systemic course based on a series of illustrations. The illustrations can be pictorial works, graphic works, photographs, book illustrations, and the like. An instructor utilizing instructor interface 104 can select the series of illustrations for any aspect(s) necessary for the instructor's purposes.

The instrument component 302 can provide various instruments to both the instructor interface 104 for design of the course and to the educational terminal 106 for completion of educational tasks. The tools can include, for example, a vertical frame, a horizontal frame, a circular frame, a magnifying glass, and the like.

The image component 304 can facilitate a search a data store 306 for one or more of a plurality of images to create the series of illustrations utilized in the course. The series of illustrations selected by the instructor can be common for different activities, different levels of esthetic development of a student, and for different work tasks. The same plurality of illustrations can serve as the basis for different courses and different methodological tools (e.g., different systems of questions, different tasks, different test types, and the like), which are different depending on the chosen subject or activity and the selected level of esthetic development of students.

Figure 4:
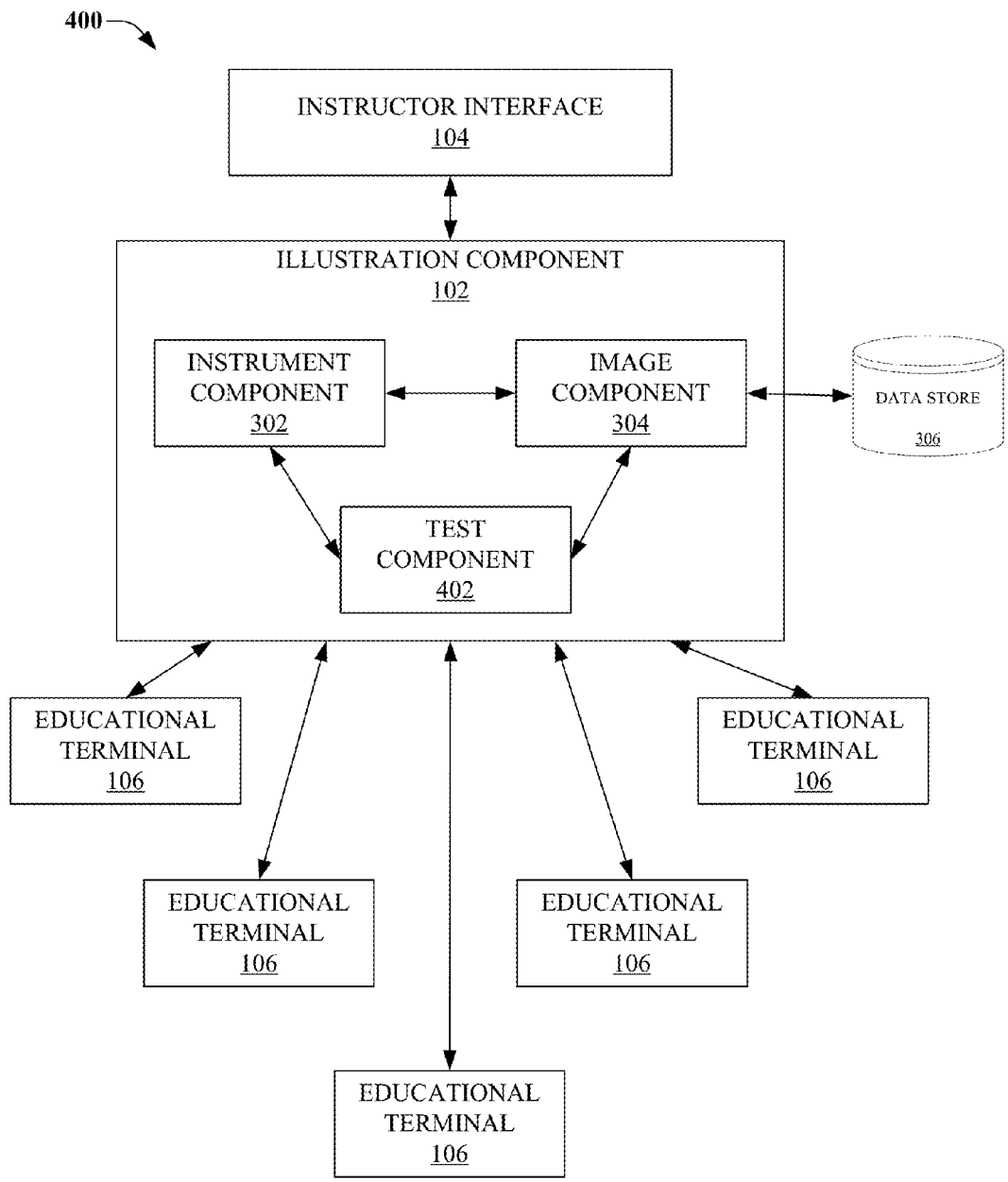
FIG. 4 illustrates an educational system, in accordance with another embodiment.

Referring now to FIG. 4, illustrated is a system 400 that can facilitate education through interactive illustrations. The illustration component 102 can further include a test component 402. The test component 402 can provide a way to track a student's academic progress in connection with the interactive illustration. For example, the test component 402 can provide various questions, tasks, or the like for a student to answer and then automatically score the responses received from the educational terminal 106. The test component 402 can provide the teacher, student, parent or any other authorized personnel with results of the test. These results can be tracked over time or any other parameter (e.g., over a class of students) by the test component 402. For example, the instructor can set a tracking parameter, and the test component 402 can process tracking data (e.g., in the form of charts, graphs, or the like) to provide data that can be used by the teacher to plan further courses.

Figure 5:
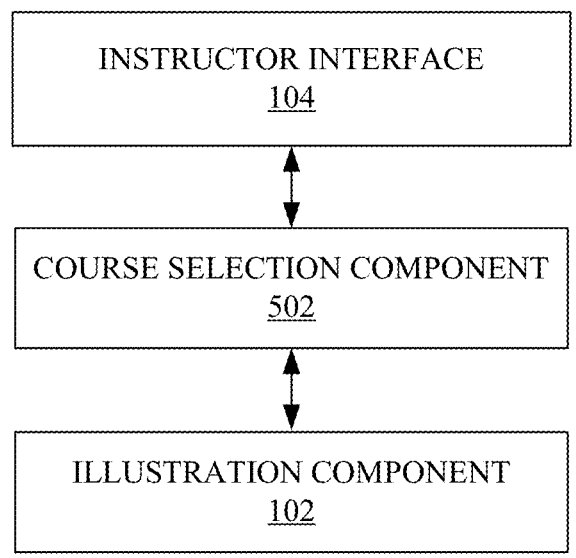
FIG. 5 illustrates a system that facilitates the design of an educational course, according to an embodiment.

Referring now to FIG. 5, illustrated is a system 500 that can facilitate design of a course through an interactive illustration. The system 500 can include a course selection component 502 and the illustration component 102 that can facilitate design of a course by the instructor utilizing the instructor interface 104. The course selection component 502 can facilitate selection of a subject or activity, a level of esthetic development of a student, and a work tasks that can define the course. The course can vary based on different subjects or activities, different levels of esthetic development of the student, and the work tasks. The illustration component 102 can facilitate the generation of the interactive illustration with a series of one or more illustrations. The series of illustrations is common for different subjects or activities, levels of esthetic development, and work tasks. So while the course can change based on the different subjects or activities, levels of esthetic development, and work tasks, the series of illustrations is generally constant for each course.

Figure 6:
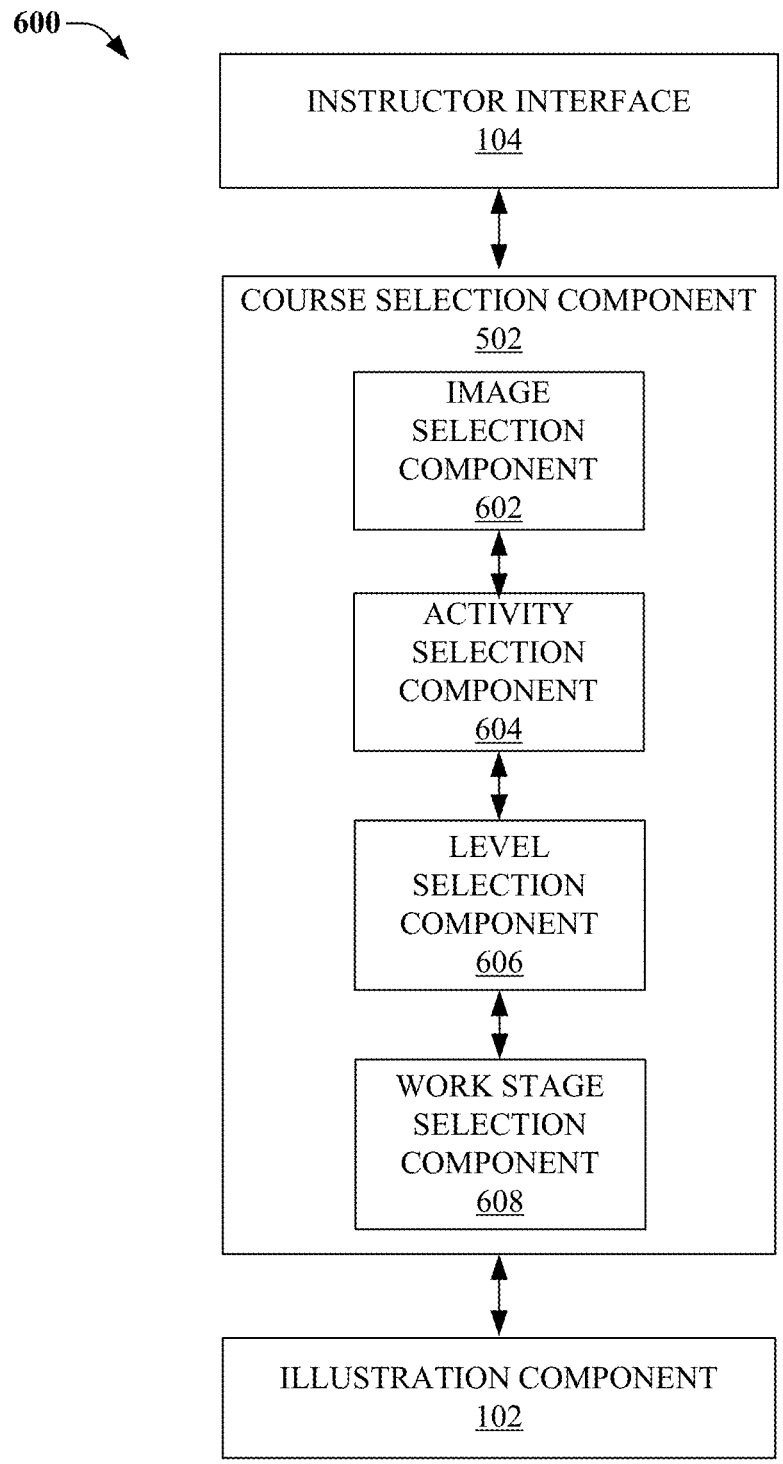
FIG. 6 illustrates a system that facilitates the design of an educational course, according to an embodiment.

Referring now to FIG. 6, illustrated is a system 600 that can facilitate design of a course through interactive illustration. The system 600 illustrates the course selection component 502 in greater detail. The course selection component 502 can include an image selection component 602. The image selection component can facilitate selection of a series of one or more images from a plurality of images (e.g., stored in a database or the illustration component 102). The image selection component 602 can ensure that the selected series of illustrations is common for different subjects or activities, different esthetic education levels and different work tasks.

The course selection component 502 can also include an activity selection component 604 that can facilitate the selection a general subject or activity. As a rule, the subject or activity is related to one or more subject areas. For example, the subject areas can be a historical-cultural study or an art criticism study. The historical-cultural study can be topical for humanities-oriented subject areas, such as world or national history, social studies, world or national literature, as well as historical sections of geography, biology, mathematics, physics, and chemistry. The art criticism study can be topical for subject areas, such as visual art and technology, world or national art history, world artistic culture and esthetics.

The course selection component 502 can also include a level selection component 606 that can facilitate selection of an esthetic development level. The level selection component 606 can provide different levels for different students, allowing the course to be customized for different students with different levels. So, for example, a class of 10 students can have 2 students at an advanced level, 5 students at an intermediate level and 3 students at a beginner level and different courses can be customized for each level. The levels can include any range of levels and not simply beginner, intermediate and advanced, although for simplicity of explanation, these three levels will be described herein. The elementary level can assume no or virtually no knowledge in the subject area. The intermediate level can assume that the student has formed elementary knowledge and ideas about the subject area. The advanced level can assume that the student possesses a level of available basic knowledge and ideas about the subject area.

According to an embodiment, since students' knowledge and ideas are formed in compliance with educational standards (e.g., specific to each state and each level), the three levels can correspond to different age groups. The elementary level (or 0-level) of esthetic development can correspond to preschool or kindergarten age or the first two grades of elementary school. The intermediate level (or that of formed elementary knowledge and ideas) can correspond to grades 3-6. The advanced level (or that of available basic knowledge and ideas) can correspond to grades 7-10. For grades 11 and 12, as well as college students, they can go directly to the third, advanced, level of esthetic development. However, such correspondence between the levels of students' esthetic development and the age groups is a conventional example and not limiting. For example, the elementary (or 0) level can be the level of development of an elementary school student, as well as that of a high school student or a college student. The same can be said about the intermediate and advanced levels of esthetic development. Moreover, each specific age group consists of students of different levels of esthetic development. Therefore, only the instructor can, from personal experience related to conversations with and observations about the student and the group as a whole, determine the level of development of each student and the group in general.

The course selection component 502 can also include a work stage selection component 608. Regardless of the chosen activity and the chosen level of esthetic development, the work selection component 608 can provide different stages of work: the study stage, the independent research stage, and the testing stage which checks the results of the study and research.

The study stage can have, for example, three categories. In the mastering the interactive instruments themselves and their capabilities category, the student can highlight fragments vertically and horizontally according to a template, highlight details as circles according to a template, and/or magnify any highlighted composition with the help of the magnifying glass. In the mastering interrelations category, the student can explore the interrelations between an illustration (the illustration as a whole world) and fragments (independent and complete small pictures) or interrelations between fragments and details (that have no independent plot meanings and serve only as clarification of the illustration or its fragments). In the mastering correlations category, the student can determine correlations between an image (the illustration as a whole and each of its fragments), its verbal description (the illustration as a whole and each of its fragments), and its name (the illustration as a whole and each of its fragments).

The research stage can have, for example, three categories. The research stage can imply the fluent and independent use of the interactive instruments for highlighting fragments and details of an illustration by testing the choice of the best instrument for solving the problem set in the task. The research stage can also test the ability to independently highlight meaningful fragments that meet the specified aspect of considering the illustration (the specified description or name) and the ability to find and show expressive details that specify and confirm the answer to the question. The research stage can also test the ability to solve both direct and inverse problems by establishing correlation between the verbal description or name of a fragment and an image contained in the fragment field. At the elementary development level, the research stage can test the ability to highlight fragments (with options) guided by the description or the name. At the intermediate development level, the research stage can test the ability to create descriptions of or give name (with options) to already highlighted fragments. At the advanced development level, the research stage can test the ability to independently highlight meaningful fragments in the illustration (various plotlines) and name and describe them.

The testing stage can test all abilities formed during the study and independent research stages. The testing stage can also include three categories, for example. The first category tests the ability to operate thoughtfully with various instruments of highlighting fragments and details, as well as with their magnified copies. The second category tests the ability to find and highlight various fragments (plotlines) in an illustration with the help of the instruments (e.g., rectangular frames) in accordance with the specified aspect of consideration and the ability to find and highlight expressive details using proper instruments (e.g., the circular frame and the magnifying glass) to prove one's opinion. The third category tests the ability to choose a name for an already highlighted fragment of the illustration out of already specified names, as well as the ability to independently create a name for an already highlighted fragment. The third category also tests the ability to independently highlight a fragment of the illustration guided by the verbal description or the name already given to the fragment and the ability to create a short written description of an already highlighted fragment or a fragment that the student has highlighted independently.

Figure 7:
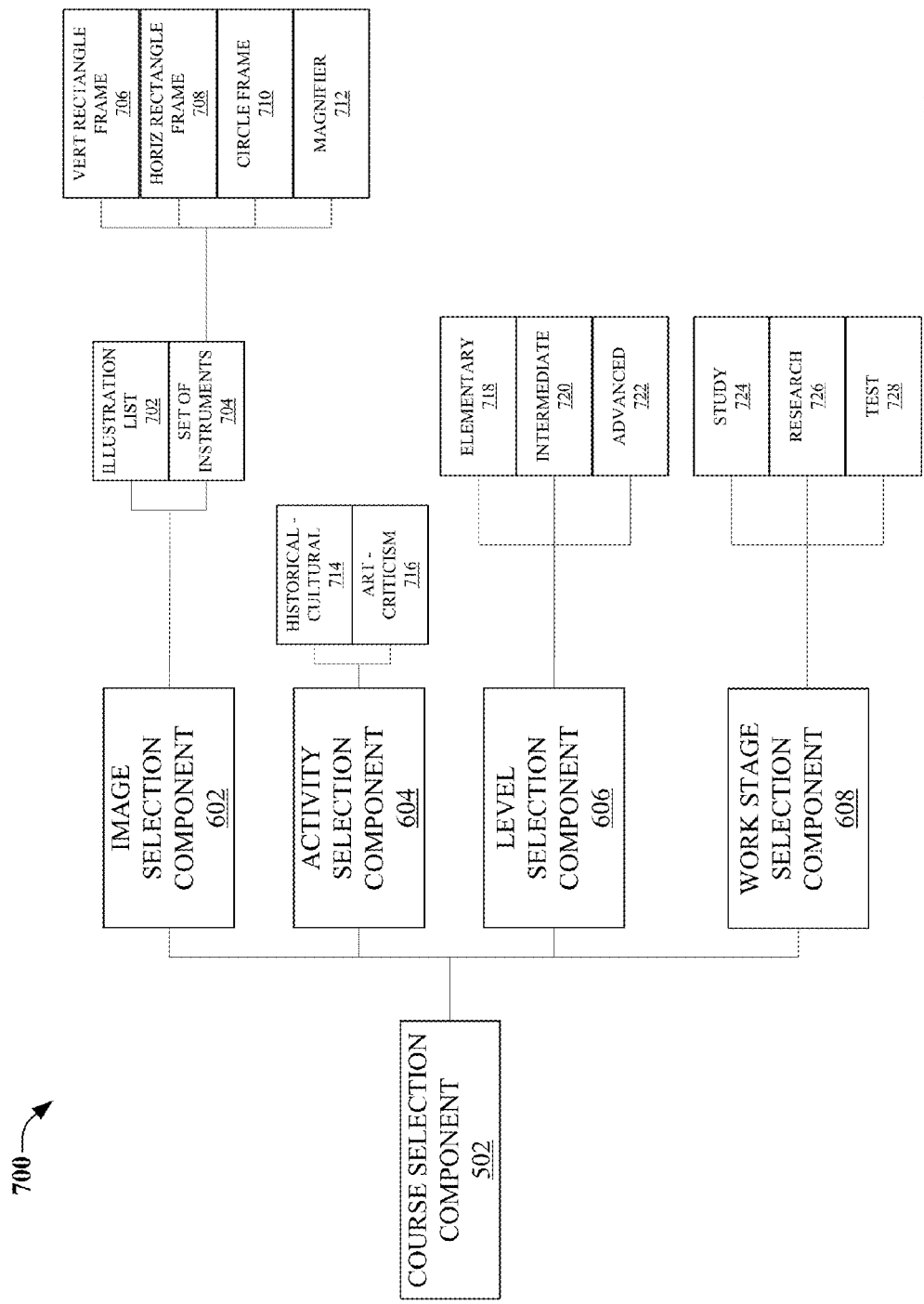
FIG. 7 illustrates a chart that illustrates components utilized in the design of an educational course, according to an embodiment.

Referring now to FIG. 7, illustrated is a chart 700 that illustrates components utilized in the design of an educational course. The course selection component 502 can have an image selection component 602, an activity selection component 604, a level selection component 606, and a work stage selection component (as described above with respect to FIG. 6).

The image selection component 602 can include an illustration list 702 that can provide a list of a plurality of images that can be used in a course. One or more of the plurality of images can be selected to form a set of image utilized for the course. The plurality of images is constant for different subjects or activities, development levels, and work tasks.

The image selection component 602 can also include a set of instruments 704, which can include a vertical rectangle frame 706, a horizontal rectangle frame 708, a circle frame 710 and a magnifier (magnifying glass) 712. The set of instruments 704 can be common for different subjects or activities. For the different subjects or activities the vertical rectangle frame 706 and the horizontal rectangle frame 708 can be used for highlighting meaningful fragments, which can be given or assigned individual names, either by the instructor or by the student. The circular frame 710 can be utilized for highlighting details, and the magnifier 712 can be utilized to enlarge the fragments and/or the details.

The set of instruments 704 can be utilized in connection with two options. According to the first option, the student can be offered fragments, details or magnified fragments/details, already highlighted with the help of the instruments. The student can find and highlight the offered fragments, details or magnified fragments/details in the illustration itself, correlate offered fragments, details or magnified fragments/details with the given and ready-at-hand descriptions or names (stating which fragment corresponds to which description or name) or compose their descriptions and give offered fragments, details or magnified fragments/details names. According to the second option, the student can be given the names or descriptions of future fragments, but not the fragments themselves, and the student is—guided by the descriptions or the names—to independently find and highlight the proper fragments in the illustration, using the most convenient instrument; if the description of the fragment is only given and its name is not given, the student is to highlight the fragment and describe it.

The activity selection component 604 can include the different subjects or activities that can be selected. The subjects or activities can include a historical-cultural study

714 and an art-criticism study 714. The illustration list 702 and the set of instruments 704 are constant for each subject or activity.

In the case where the activity is a historical-cultural study 714, the subject matter is life itself, and the corresponding interactive illustration is a resource that clarifies, supplements or specifies a life reality under study. An illustration can help to form or to reconstruct a historical-cultural phenomenon under study, which in a given case is part of social life itself and not only part of artistic reality. A student undertaking this activity is not interested in when exactly an artist who recreated a historical-cultural event lived and which artistic trend the artist represented; the student is only interested in the artist's scientific integrity and the artistic touch of the piece of art itself (if it helps to understand the factual truth). The methodological tools within this activity are aimed at identifying the essence of the depicted event as a real social and historical-cultural fact; therefore, all questions and tasks are aimed at helping the student to discover this essence, to find all details necessary to understand the real event, and to reconstruct the social content of the event under study by these details.

In the case where the activity is an art-criticism study 716, the subject matter is art itself with its inherent logic of development in the context of changing artistic trends, schools and styles, and an interactive illustration is a resource that reflects a certain stage (moment) in the development of art. A student using this activity is interested in when and in what country an artist lived, to which trend of art he belonged, and which stylistic regularities he displayed in his creative work. The methodological tools within this activity are aimed at revealing only the artistic truth that lies not in the sphere of events, but in the sphere of the subjective authorial perception and apprehension of these events—in the spiritual, psychological sphere—the sphere of authorial feelings. All questions and tasks are aimed not only at helping students reveal this artistic truth, but also at motivating them to find out artistic techniques with which the author attains this or that impression. Elucidating the means (the choice of genre, the format of canvas, the composition, the aspects used, the degree of generalization in rendering personages, the use of contrasts, light and shade, color scales, brushstrokes, the characteristics of the colorific surface of the canvas or paper formulation, and the like) that help the author produce exactly this impression is the vector of the operation of the methodological tools when art-criticism is chosen as the activity.

The level selection component 606 can facilitate the selection of the level of esthetic development. The level can be elementary 718, intermediate 720 or advanced 722, depending on age, grade level, experience, or the like. The instructor can gauge the level for each student or for the entire class based on conversations, previous work submitted, and the like. Accordingly, the level of development can be customized for individual students or standardized among an entire class or grade level. The illustration list 702 and the set of instruments 704 are constant for each level of development.

Figure 8:
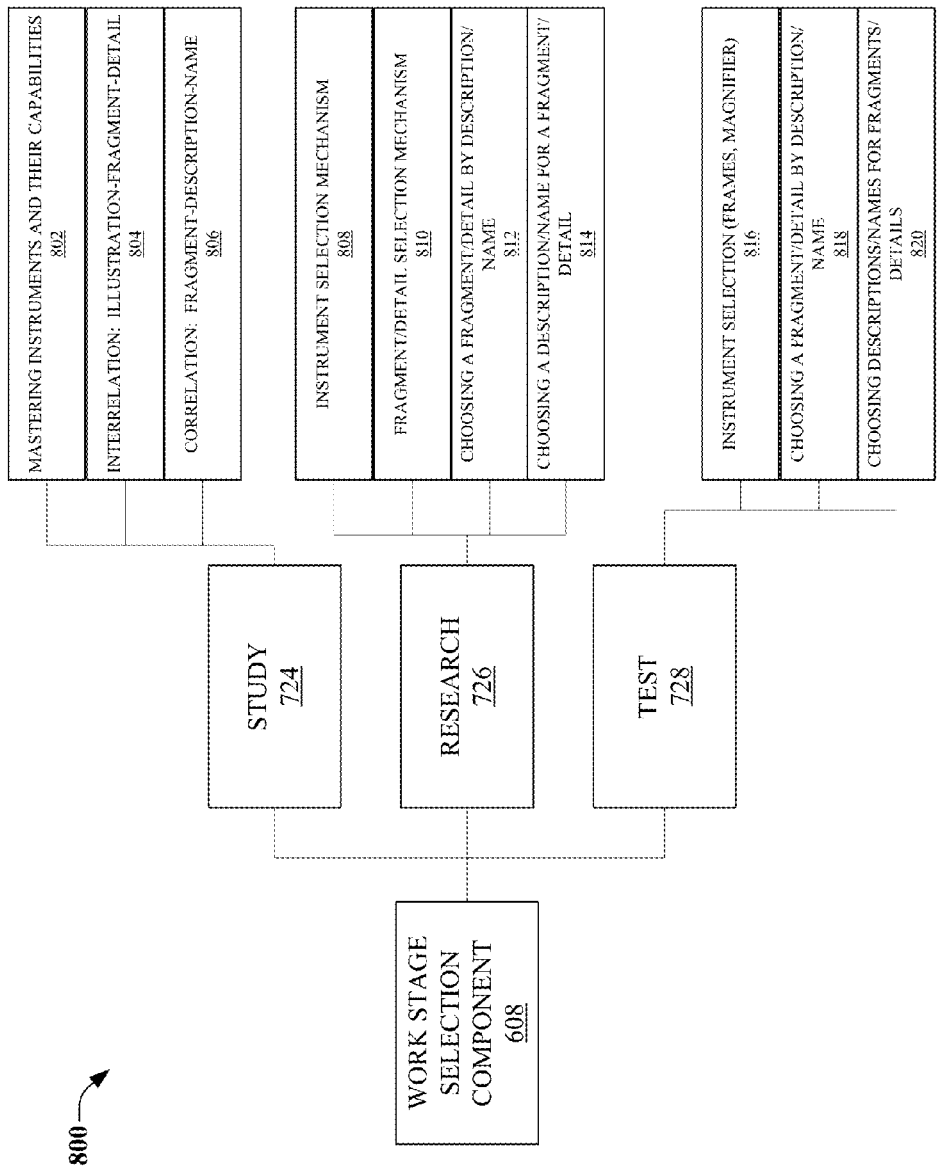
FIG. 8 illustrates a chart that illustrates components utilized in the design of an educational course through selection of a work stage, according to an embodiment.

The work stage selection component 608 can facilitate selection of a stage of work: a study stage 724, an independent research stage 726 and a testing stage 728. Regardless of the chosen activity and the chosen difficulty level, the illustration implies these three stages of work, which are better illustrated by the chart 800 of FIG. 8.

The study stage 724 can have three categories: mastering instruments and their capabilities 802, interrelation: illustration-fragment-detail 804 and correlation: fragment-description-name 806. In the mastering instruments and their capabilities 802 category, a student can highlight fragments vertically and horizontally according to a template, highlight details as circles according to a template and magnify any highlighted composition (vertical, horizontal and circular) with the help of the magnifier. In the interrelation: illustration-fragment-detail category, the student can master the interrelations between the illustration and fragments and between fragments and details. In the correlation: fragment-description-name 806 category, the student can master correlations between an image, its verbal description and its name.

At the elementary level of esthetic development, the study 724 stage should necessarily cover all three positions, but should be limited to the following procedures. The student is mastering the interactive rectangular frame to be able to highlight both vertical and horizontal compositions, but not yet learning to differentiate between the features and advantages of a vertical or horizontal composition. The student is mastering the interactive circular frame to be able to highlight necessary details, but is not yet learning to choose the most expressive detail from all possible details. The student is working with templates, highlighting fragments already highlighted by the instructor. In a situation where an illustration is given as a whole with a highlighted fragment in it, the student, looking at the image, can highlight this fragment with a frame in the similar illustration given next to it. In a situation where a separate illustration is given as a separate highlighted fragment (not embedded in the illustration field), the student is looking for it with the help of the frame in the similar illustration given next to it. However, the student who is at the elementary level of esthetic development is not looking for options other than the already highlighted fragment and is not comparing shades of meaning that emerge as the rectangular frame shifts. The student is also learning to create the content of each already highlighted and verbally described fragment with the image that is in each fragment's field, the name of each highlighted fragment with the fragment's image, to understand that, when assessing the fragment's content, the student should not refer to the context that stays outside the frame. However, at this stage, the student does not highlight fragments independently, guided by the names given, and does not create names, guided by the already highlighted fragments.

At the intermediate level of esthetic development, the student is learning to differentiate between the features and advantages of a vertical and horizontal composition as applied to the same plot included in a fragment, to find details different in content with the help of the circular frame, and to use the function of magnifying a frame or detail thoughtfully. The student also goes beyond the work with templates, looking for other options of the already highlighted fragment, comparing the shades of meaning that emerge as the rectangular frame shifts, and learning to select the most expressive detail from all possible details to answer the posed question and to prove a point of view. The student can also highlight fragments independently, guided by the given names and descriptions, create names, guided by the already highlighted fragments and create descriptions of the already highlighted fragments. The student can also critically analyze the results of the automatic testing of the actions and is able to do correction work.

At the advanced level of esthetic development, the student can independently choose instruments necessary for the work and most suited for solving the range of problems posed. The student can demonstrate the capabilities and merits of the instruments as a means of study and research on illustrations, as well as the mechanism used for automatic testing of deliverables. The student can easily and independently work with different combinations of pictorial and verbal information, namely correcting the names of highlighted fragments, as well as the very images entered into the fragment fields (in a situation where the names are already given by the instructor and the fragments themselves are already highlighted), finding various options of fragments that fit the name already given and creating various options of names for the highlighted fragment. The student can also independently highlight fragments, describe them, and name them. The student can evaluate the mechanism of automatic testing of deliverables and mistakes made as the necessary learning event, is able to justify the cause of mistakes and justify them.

The research stage 726 can have four categories: instrument selection mechanism 808, fragment/detail selection mechanism 810, choosing a fragment/detail by description/name 812 and choosing a description/name for a fragment/detail 814. In the: instrument selection mechanism 808 category, the student can master independent and fluent use of the interactive instruments for highlighting fragments and details of an illustration and the use of the correct instrument for solving the problem. According to the fragment/detail selection mechanism 810 category, the student can perfect the ability to independently highlight meaningful fragments and meet the specified aspect of considering the illustration and the ability to find and show expressive details that specify and confirm the answer to the question. In the categories of choosing a fragment/detail by description/name 812 and choosing a description/name for a fragment/detail 814, the student can master the ability to solve both direct and inverse problems by establishing a correlation between the verbal description or name of a fragment and an image contained in the fragment field.

The test 728 stage can have three categories: instrument selection 816, choosing a fragment/detail by description/name 818 and choosing descriptions/names for the fragments/details 820. These categories can test all of the abilities formed during the study 724 and research 726 stages.

Figure 9:
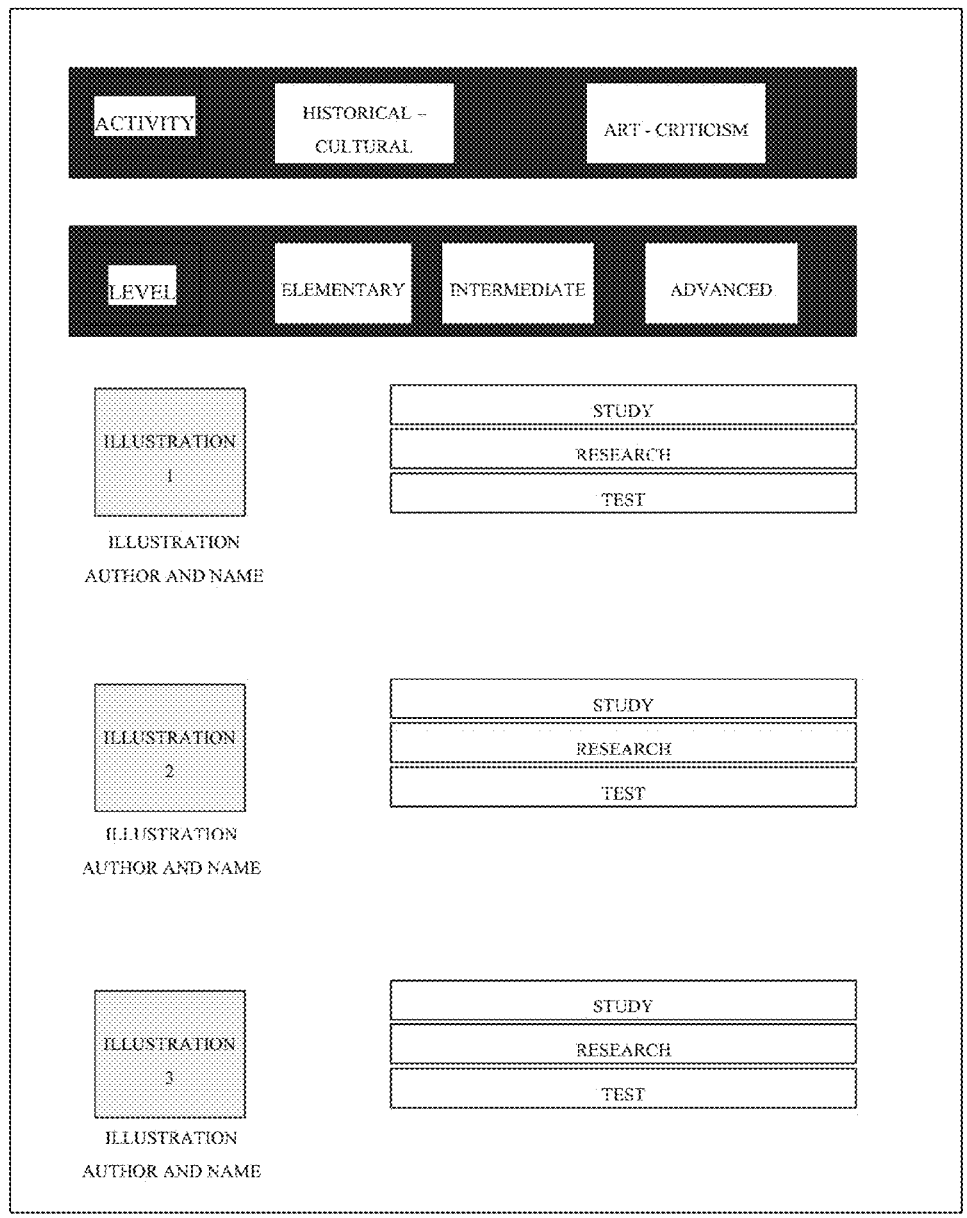
FIGS. 9-19 illustrate various examples of interfaces related to an educational course.

FIGS. 9-19 illustrate examples of various interfaces that can be utilized in connection with the interactive illustrations and/or courses described herein. FIG. 9 provides an example 900 of an interactive illustrations package that can facilitate designing a course. The instructor can select an activity, a level, an illustration, and a work task from interface 900 to create a course.

Figure 10:
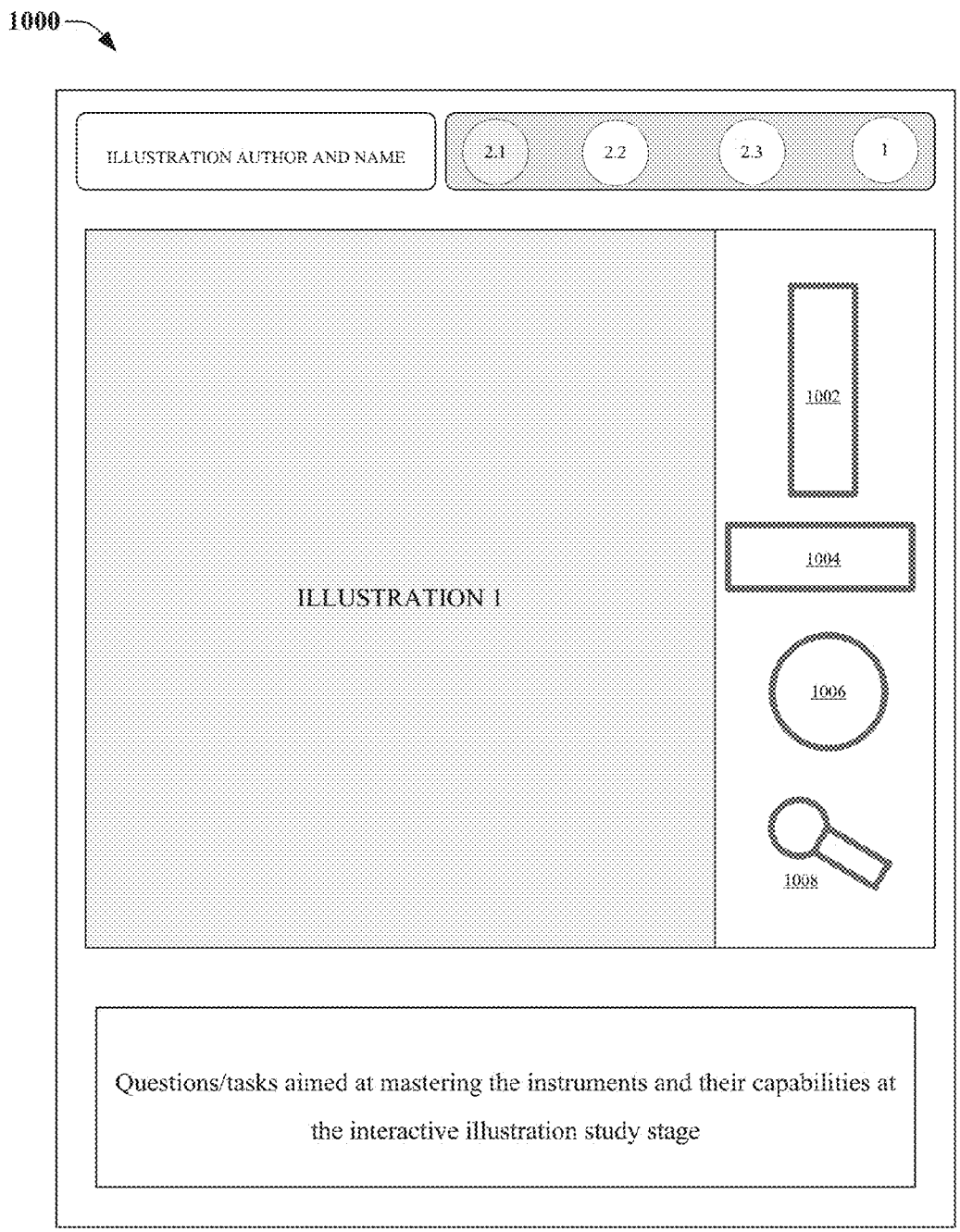
Figure 11:
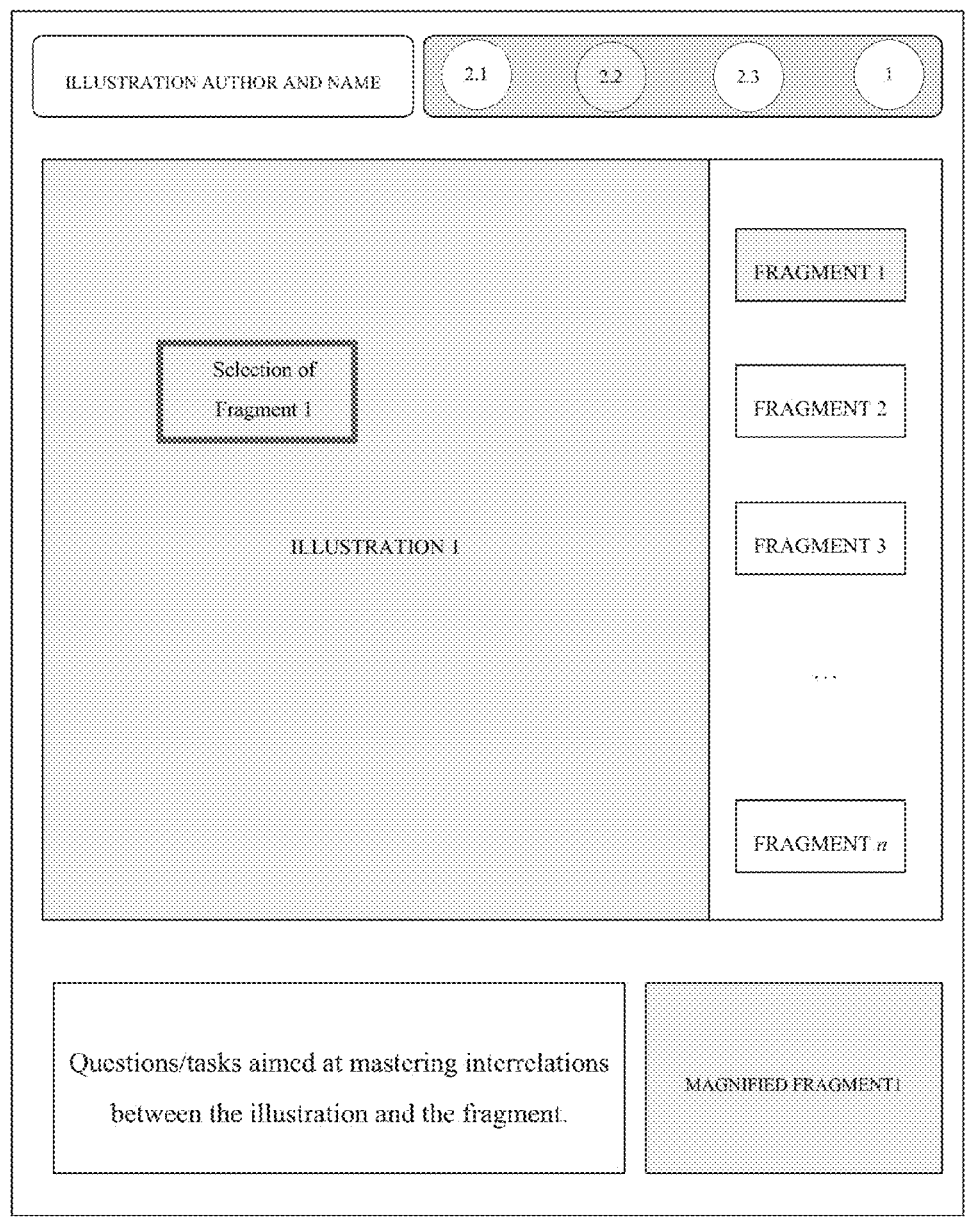
Figure 12:
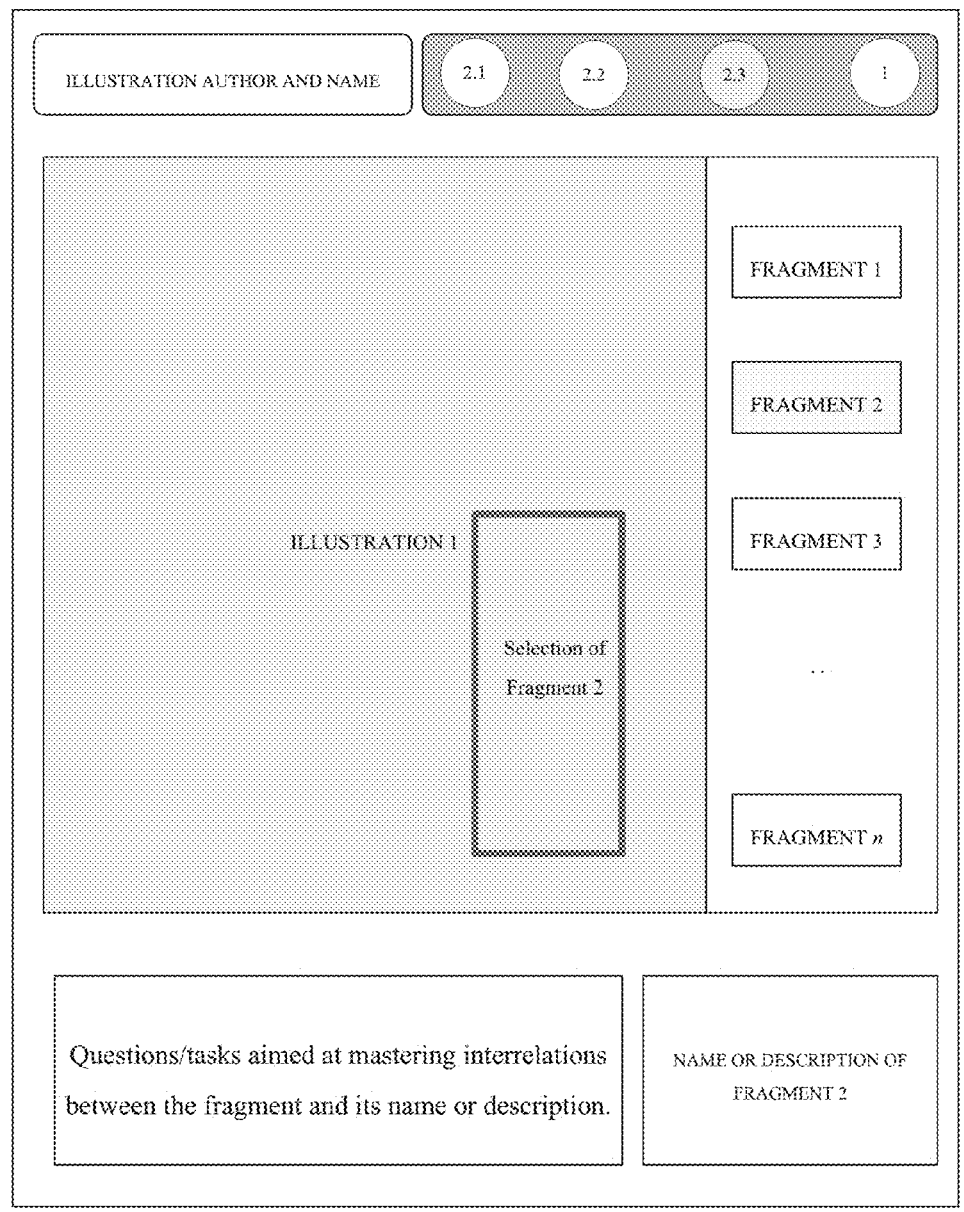

FIG. 10 is an example interface 1000 utilized in connection with a study work task: mastering the instruments (1002-1008) and their capabilities 802. FIG. 11 is an example interface 1100 utilized in connection with a study work task: interrelation: illustration-fragment-detail 804. FIG. 12 is an example interface 1200 utilized in connection with a study work task: correlation: fragment-description-name 806.

Figure 13:
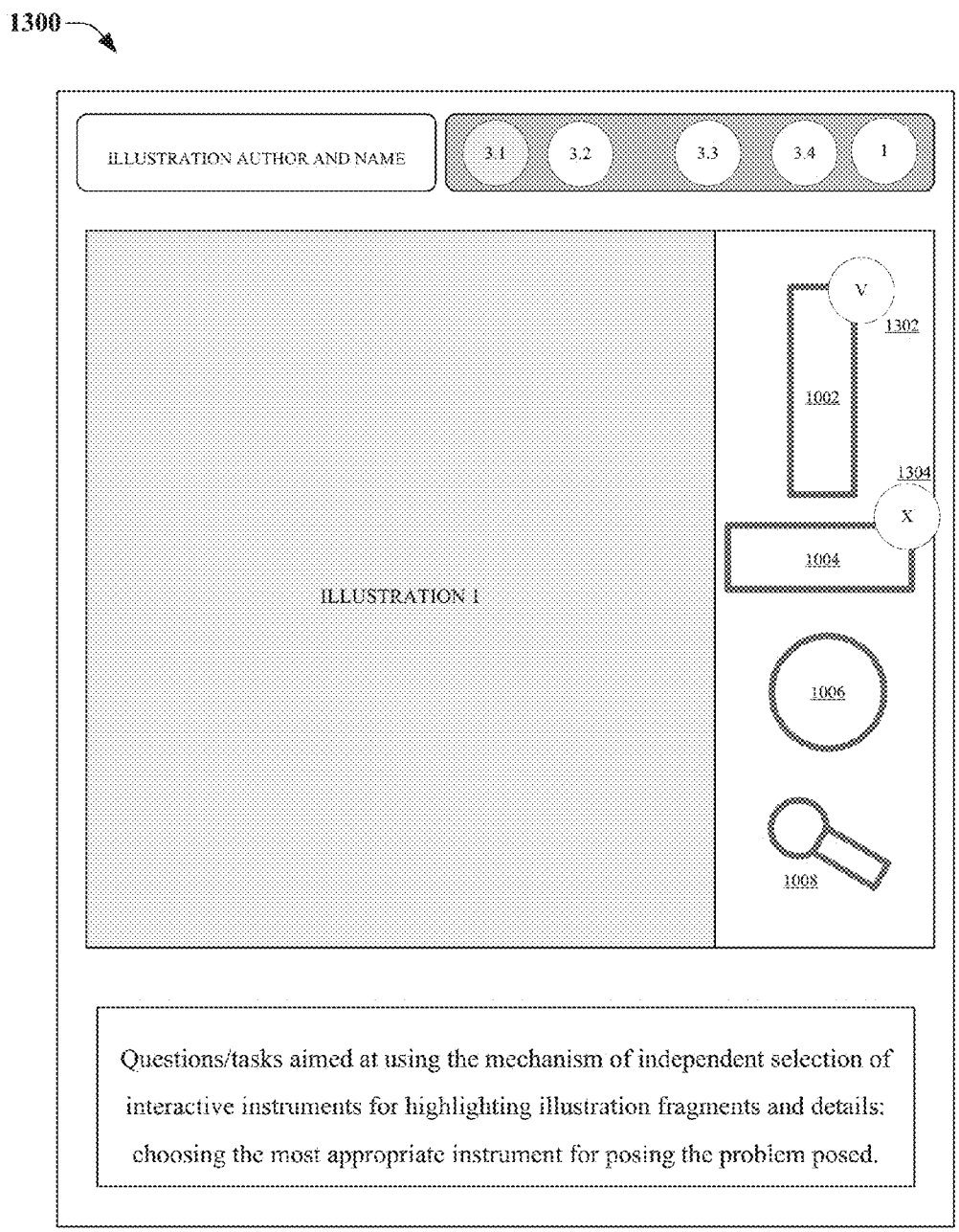
Figure 14:
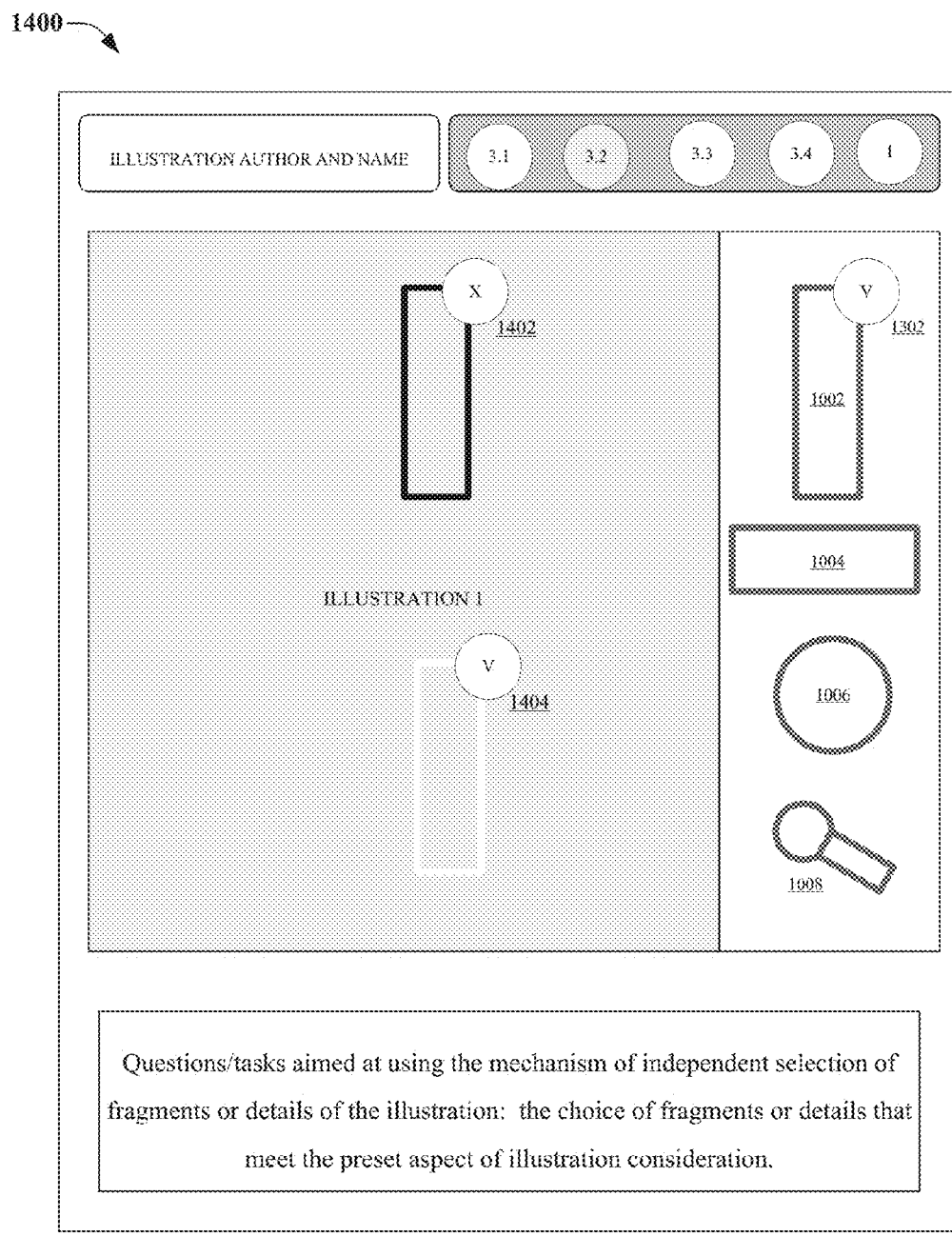
Figure 15:
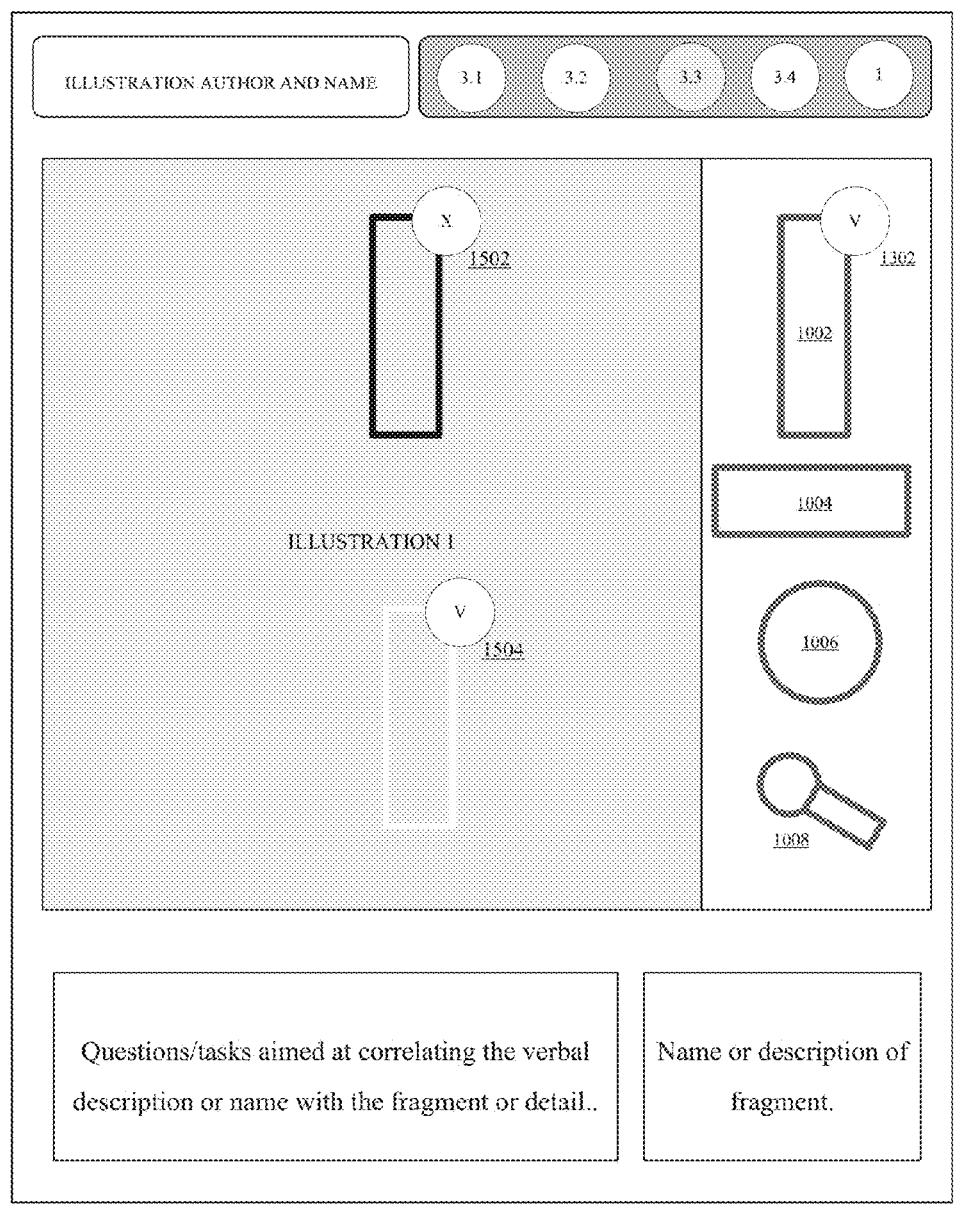
Figure 16:
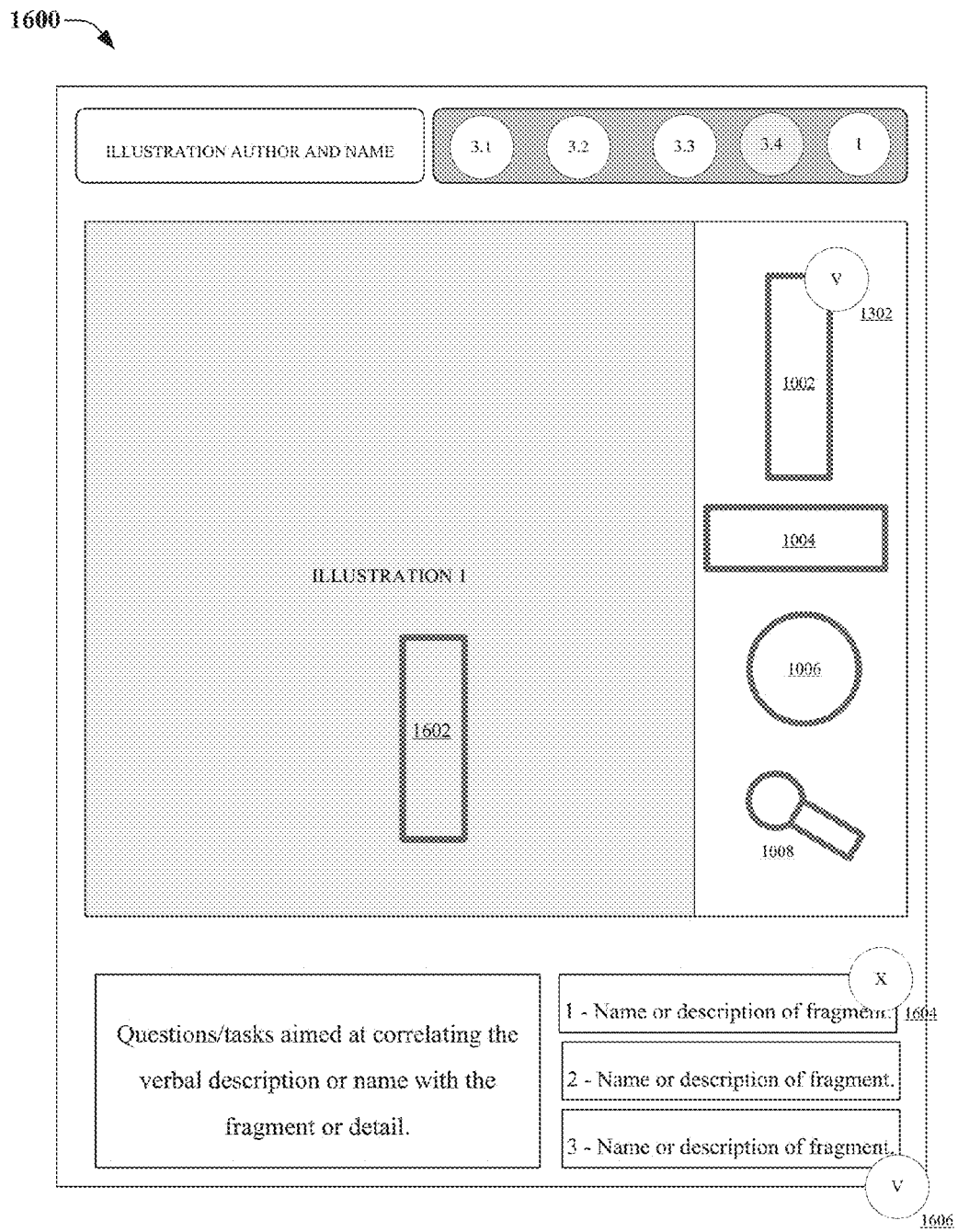

FIG. 13 is an example interface 1300 utilized in connection with a research work task: instrument selection mechanism 808. In this example, the correct selection of the instrument is indicated by a V 1302, and the incorrect selection of the instrument is represented by an X 1304. FIG. 14 is an example interface 1400 utilized in connection with a research work task: fragment (detail selection mechanism) 810. In this example, an incorrect fragment selection is marked by an X 1402 and a correct fragment selection is marked by a V 1404. FIG. 15 is an example interface 1500 utilized in connection with a research work task: choosing the fragment (detail) by description (name) 812. In this example, an incorrect fragment selection is marked by an X 1502 and a correct fragment selection is marked by a V 1504. FIG. 16 is an example interface 1600 utilized in connection with a research work task: choosing the description (name) for the fragment 814. The fragment 1602 is highlighted in the image pane, and an incorrect name choice is indicated by an X 1604, while the correct name choice is indicated by a V 1606.

Figure 17:
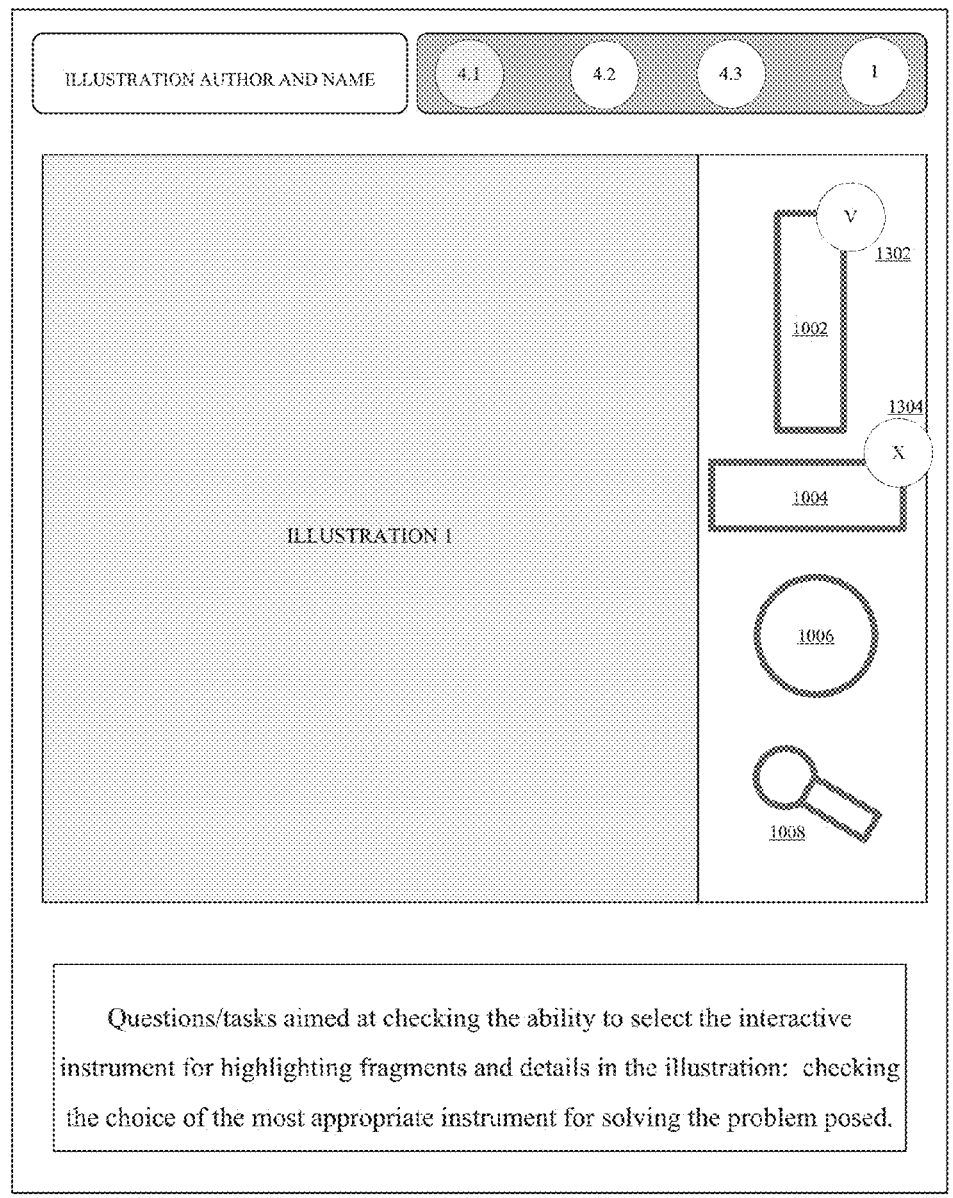
Figure 18:
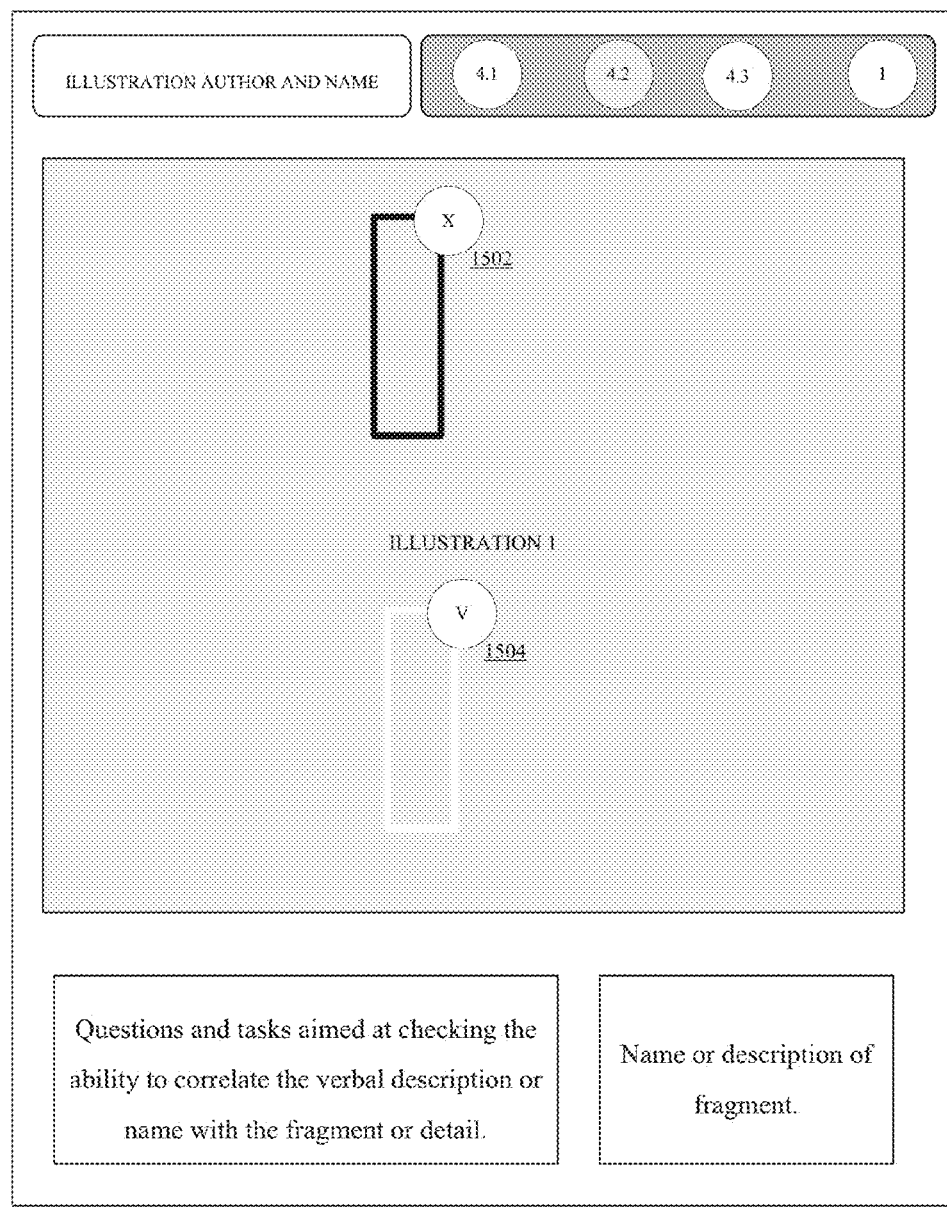
Figure 19:
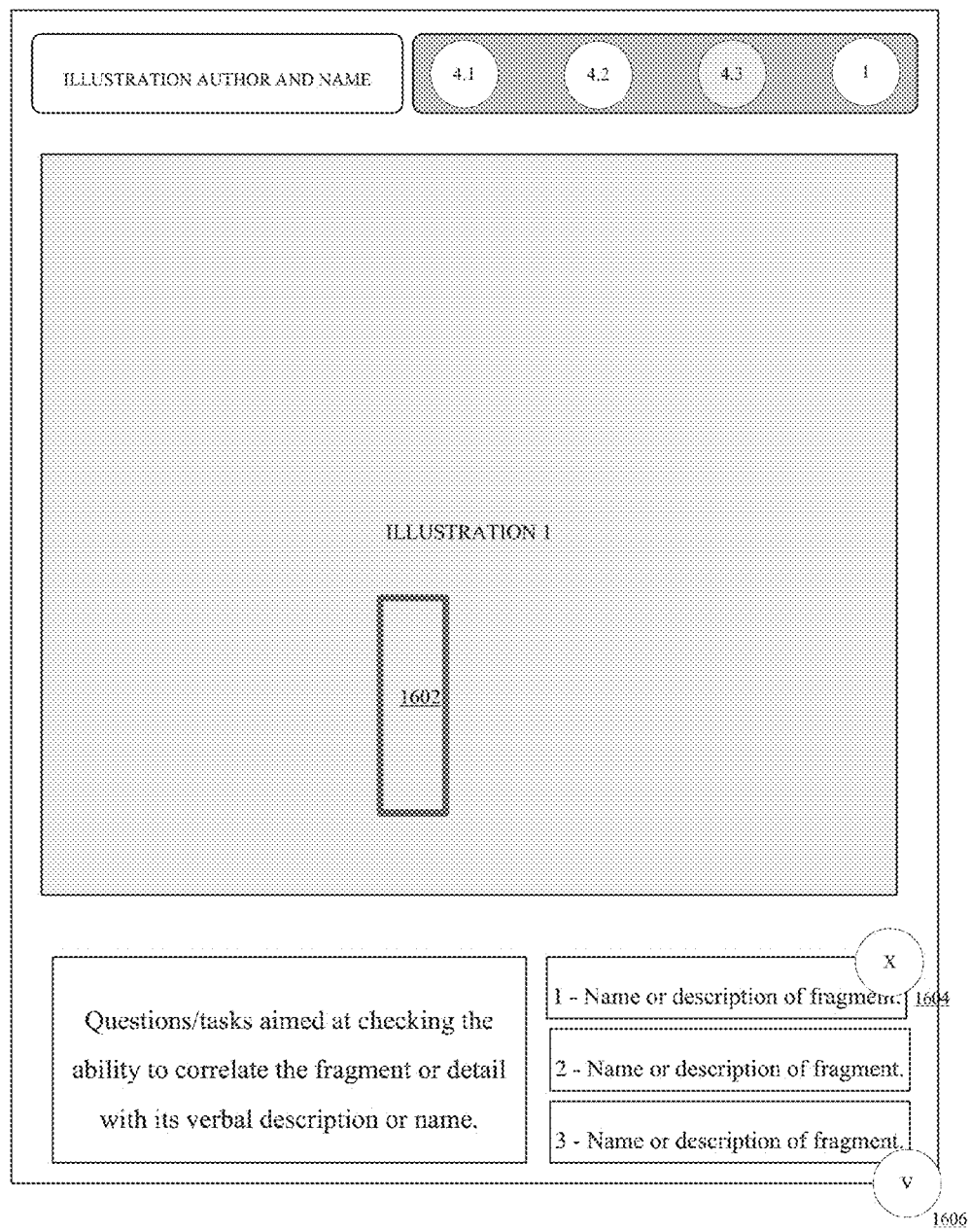

FIG. 17 is an illustration 1700 of a testing stage: instrument selection 816. A correct instrument selection is indicated by a V 1302, while an incorrect instrument selection is indicated by an X 1304. FIG. 18 is an illustration 1800 of a testing stage: fragment (detail) selection by description (name) 818. A correct fragment selection is indicated by a V 1502, while an incorrect fragment selection is indicated by an X 1504. FIG. 19 is an illustration 1900 of a testing stage: choosing descriptions (names) for fragments (details) 820. The fragment 1602 is highlighted in the image pane, and an incorrect name choice is indicated by an X 1604, while the correct name choice is indicated by a V 1606.

Figure 20:
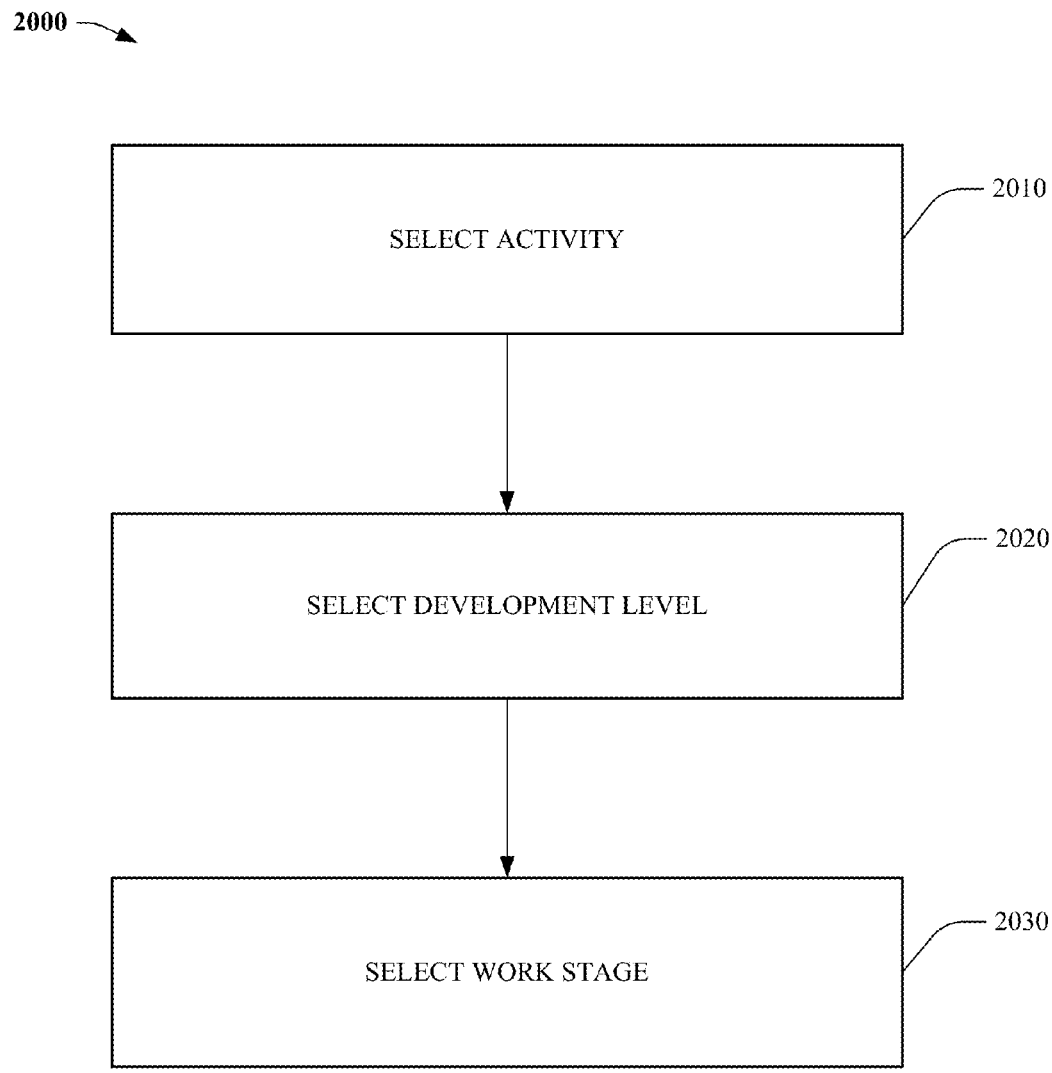
FIGS. 20-21 illustrate various processes associated with designing an educational course, in accordance with an embodiment.
Figure 21:
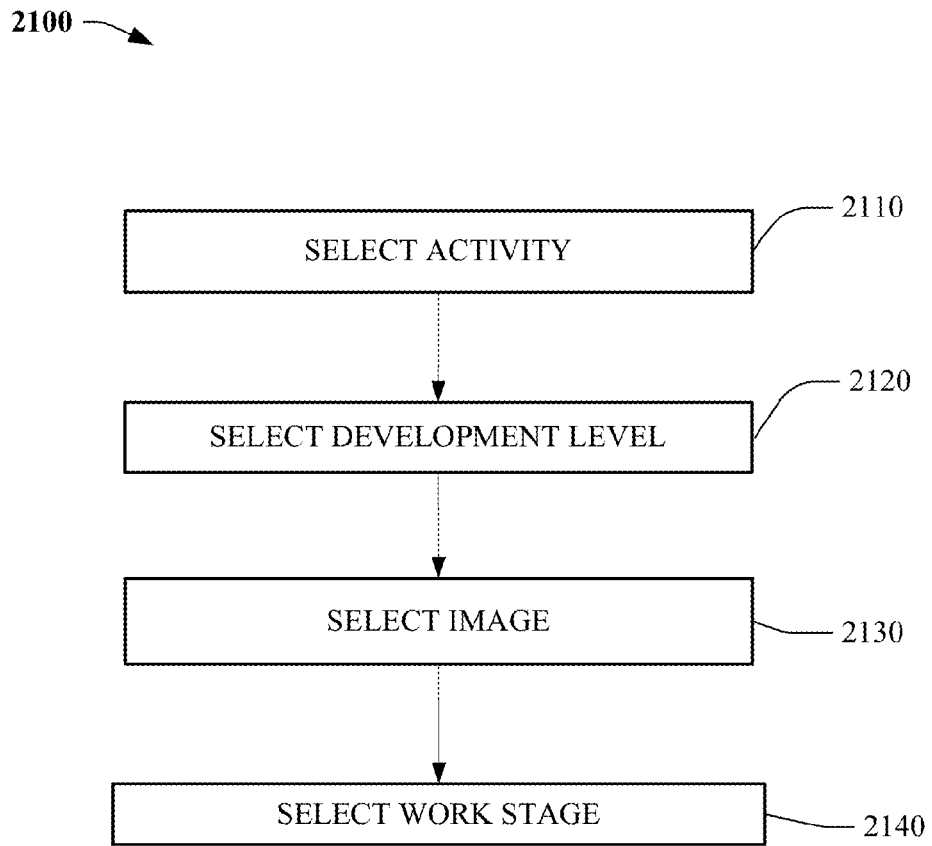

FIGS. 20-21 illustrate various processes performed by a system, e.g., systems 100 and 300-800, etc. in accordance with the disclosed subject matter. For simplicity of explanation, the methodologies are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 20, a process 2000 associated with configuring a course for electronic learning utilizing an interactive illustration is illustrated. At 2010, an activity can be selected. The activity can be a historical-cultural activity or an art-criticism activity. At 2020, a development level can be selected. The development level can be elementary, intermediate or advanced, chosen according to age, experience or any other category of a student or group of students. The developmental level can be chosen for an individual student to create a customized educational plan. The developmental level can also be standardized according an entire class of students to create a standardized course for the class. At 2030, a work stage can be selected. A plurality of images can be used for this course, regardless of the activity, the development level, and the work stage. The work stage can be a study stage, a research stage, or a testing stage. The work stages do not change based on the activity, but do change based on the development level (e.g., adding or removing challenges).

An instructor can design a course in this manner, for example, by accessing a course selection component 502 or an illustration component 102 through an instructor interface 104. The illustration component is also coupled to a plurality of educational components, from which students can access the course designed according to process 2000.

FIG. 21 illustrates another process 2100 associated with configuring a course for electronic learning utilizing an interactive illustration. At 2110, an activity can be selected. Then a development level can be selected 2120. Based on the activity and the development level, an image or a series of images can be selected 2130.

Similar to process 2000, an instructor can design a course in this manner, for example, by accessing a course selection component 502 or an illustration component 102 through an instructor interface 104. The illustration component is also coupled to a plurality of educational components, from which students can access the course designed according to process 2100.

Figure 22:
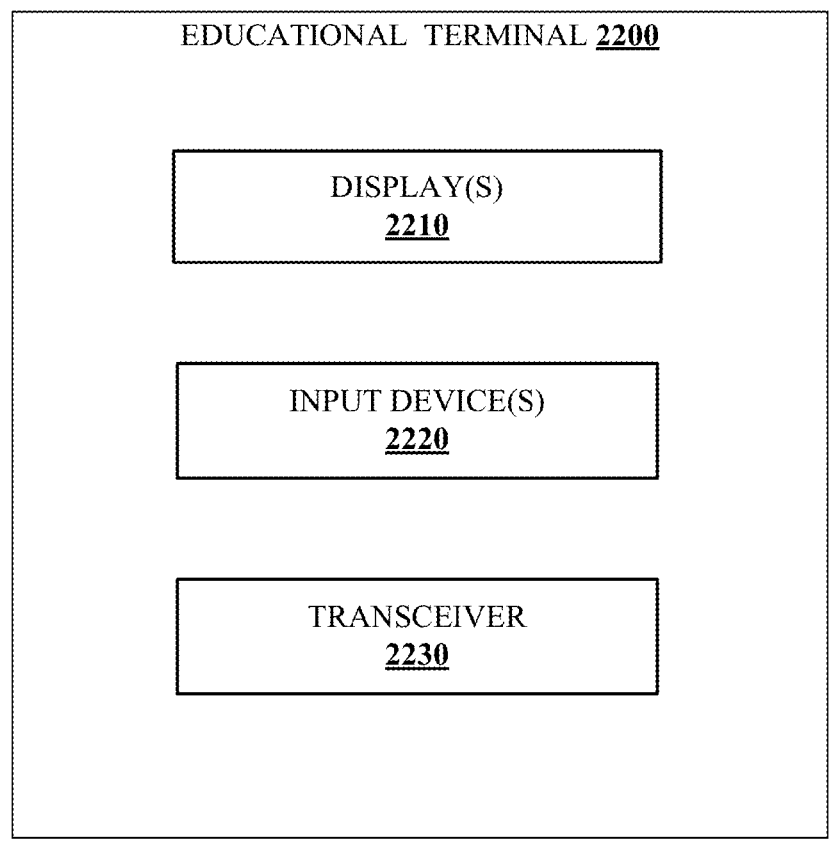
FIG. 22 illustrates a block diagram of an educational terminal, in accordance with an embodiment.
Figure 23:
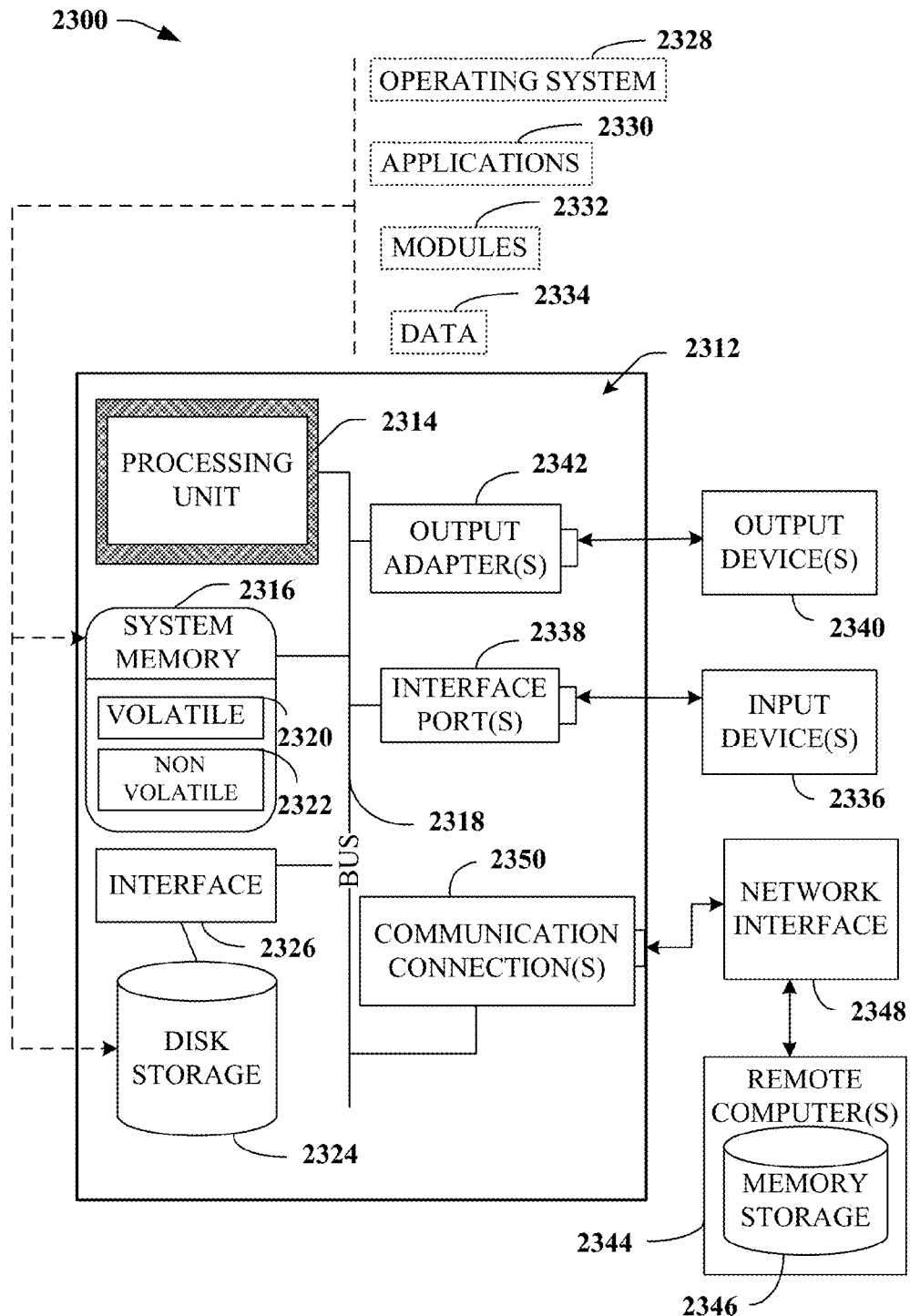
FIG. 23 illustrates a block diagram of a computing system operable to execute the disclosed methods and apparatus, in accordance with an embodiment.

The systems and methods described above can be implemented in software, hardware, or a combination thereof. FIGS. 22 and 23 provide hardware context for the devices, user interfaces and methods described above. FIG. 22 illustrates an educational terminal 2200 that can be utilized in connection with the devices, user interfaces and methods described above. FIG. 23 illustrates a computing network 2300 that can be utilized in connection with facilitating the systems and methods described above. It should be appreciated that artificial intelligence can also be utilized to implement the systems and methods described herein.

Referring now to FIG. 22, an educational terminal 2200 (e.g., 106) is illustrated, in accordance with an embodiment. Educational terminal can be associated with an identification number, e.g., IP address, password, etc. by which an illustration component (e.g., 102) can use to communicatively couple to the educational terminal The Educational terminal can include a display(s) 2210 that can include at least two screens to facilitate display of the interactive illustration. Input device(s) 2220 can include various mechanical and/or virtual input devices, e.g., a keyboard, a virtual keyboard, a virtual writing pad, a microphone, etc. from which educational terminal 2200 can receive student input, e.g., answers to test questions, questions/comments related to a course, etc. Transceiver 2230 can include a wireless transmitter and receiver that can transmit/receive a course, student input, grades etc. to/from the educational terminal utilizing, e.g., Wi-Fi™, WiMAX™, Bluetooth™ 3GPP, 3GPP2, LTE™, LTE™ Advanced, UMTS, GSM, NFC, etc.

In one aspect described above, educational terminal 2200 can include an internet-ready (or network capable) camera and/or microphone for use with internet-based (or network-based) services, e.g., associated with remote group instruction. In another aspect, such device(s) can be utilized with voice and/or video over internet protocols during an academic and/or instructional activity occurring, e.g., away from a classroom, etc.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in database 306, non-volatile memory 2322 (see below), disk storage 2324 (see below), and memory storage 2346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In order to provide a context for the various embodiments, FIG. 23, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, handheld computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 23, a block diagram of a computing system 2300 operable to execute the disclosed systems and methods is illustrated, in accordance with an embodiment. Computer 2312 includes a processing unit 2314, a system memory 2316, and a system bus 2318. System bus 2318 couples system components including, but not limited to, system memory 2316 to processing unit 2314. Processing unit 2314 can be any of various available processors. Dual microprocessors and other multiprocessor architectures also can be employed as processing unit 2314.

System bus 2318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 2316 includes volatile memory 2320 and nonvolatile memory 2322. A basic input/output system (BIOS), containing routines to transfer information between elements within computer 2312, such as during start-up, can be stored in nonvolatile memory 2322. By way of illustration, and not limitation, nonvolatile memory 2322 can include ROM, PROM, EPROM, EEPROM, or flash memory. Volatile memory 2320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2312 also includes removable/non-removable, volatile/non-volatile computer storage media. FIG. 23 illustrates, for example, disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2324 to system bus 2318, a removable or non-removable interface is typically used, such as interface 2326.

It is to be appreciated that FIG. 23 describes software that acts as an intermediary between users and computer resources described in suitable operating environment 2300. Such software includes an operating system 2328. Operating system 2328, which can be stored on disk storage 2324, acts to control and allocate resources of computer system 2312. System applications 2330 take advantage of the management of resources by operating system 2328 through program modules 2332 and program data 2334 stored either in system memory 2316 or on disk storage 2324. It is to be appreciated that the disclosed subject matter can be implemented with various operating systems or combinations of operating systems.

A user can enter commands or information, e.g., via interface component 2326, into computer 2311 through input device(s) 2336. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2314 through system bus 2318 via interface port(s) 2338. Interface port(s) 2338 include, for example, a serial port, a parallel port, a game port, and a universal serial bus (USB). Output device(s) 2340 use some of the same type of ports as input device(s) 2336.

Thus, for example, a USB port can be used to provide input to computer 2312 and to output information from computer 2312 to an output device 2340. Output adapter 2342 is provided to illustrate that there are some output devices 2340 like monitors, speakers, and printers, among other output devices 2340, which use special adapters. Output adapters 2342 include, by way of illustration and not limitation, video and sound cards that provide means of connection between output device 2340 and system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. Remote computer(s) 2344 can be a personal computer, a server, a router, a network PC, a workstation, a microprocessor based appliance, a peer device, or other common network node and the like, and typically includes many or all of the elements described relative to computer 2312.

For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2350 refer(s) to hardware/software employed to connect network interface 2348 to bus 2318. While communication connection 2350 is shown for illustrative clarity inside computer 2312, it can also be external to computer 2312. The hardware/software for connection to network interface 2348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a memory to store computer-executable instructions; and
a processor that executes or facilitates execution of the computer-executable instructions to at least:
receive, from a first device, a selection of an image of a plurality of images to be used for a set of interactive lessons;
receive, based on a selection tool of the first device, a first indication specifying a first portion of the image for a first lesson of the set of interactive lessons;
receive, from the first device, a second indication of a first activity, associated with the first portion, for the first lesson, wherein the first activity for the first lesson is selected from a group of activities, and wherein the first activity comprises identifying the first portion via at least a second device, providing a name for the first portion via at least the second device, or providing a description associated with the first portion via at least the second device;
receive, from the first device, a third indication of a group of user interface instruments associated with the first activity, wherein the group of user interface instruments is displayed on the first device;
define a first educational goal, for a first student identity associated with the second device, based on the first activity and the group of user interface instruments;
generate a first interactive image for display on a first screen of the second device that facilitates presentation of the first activity for the first lesson according to the first educational goal, wherein the group of user interface instruments associated with the third indication from the first device is displayed with the first interactive image on the first screen of the second device, wherein a position of a user interface instrument from the group of user interface instruments with respect to the first screen and the first interactive image is varied based on input data provided to the second device, and wherein the group of user interface instruments is employed for the identifying the first portion via the second device, the providing the name for the first portion via the second device, or the providing the description associated with the first portion via the second device;
generate a virtual keyboard for display on a second screen of the second device that is a sensor screen and facilitates user input associated with at least the providing the name and the providing the description of the first activity for the first lesson; and
generate the first interactive image for display on a screen of a third device that facilitates presentation of the first activity for the first lesson according to a second educational goal that is different than the first educational goal, wherein the second educational goal is defined, for a second student identity associated with the third device, based on the first activity and the group of user interface instruments, wherein the group of user interface instruments associated with the third indication from the first device is displayed with the first interactive image on the screen of the third device, and wherein the group of user interface instruments is employed for the identifying the first portion via the third device, the providing the name for the first portion via the third device, or the providing the description associated with the first portion via the third device.

2. The system of claim 1, wherein the processor further executes or facilitates the execution of the computer-executable instructions to at least generate a series of questions for display on the second device that are related to the first activity, and determine whether the first educational goal has been satisfied based on the series of questions.

3. The system of claim 1, wherein the processor further executes or facilitates the execution of the computer-executable instructions to at least receive, from the first device, an indication of a subject area of a plurality of subject areas related to the first lesson.

4. The system of claim 1, wherein the processor further executes or facilitates the execution of the computer-executable instructions to at least receive, from the first device, an educational level related to the first lesson.

5. The system of claim 1, wherein the processor further executes or facilitates the execution of the computer-executable instructions to at least:
receive an indication of a subject area of a plurality of subject areas related to the first lesson;
receive an indication of an educational level related to the first lesson; and
generate the first lesson, comprising the first interactive image, based on the subject area, the educational level, and the first educational goal.

6. The system of claim 5, wherein the processor further executes or facilitates the execution of the computer-executable instructions to at least:
generate other lessons of the set of lessons based on received indications of subject areas, received indications of educational levels, defined educational goals, and a set of other interactive images generated as a function of the image and indications specifying other portions of the image and respective activities for the other portions of the image.

7. The system of claim 1, wherein the processor further executes or facilitates the execution of the computer-executable instructions to at least:
receive data associated with the group of user interface instruments from the second device to facilitate determining whether the first educational goal satisfies a defined criterion.

8. A method, comprising:
receiving, by a system comprising a processor, a selection of an image of a plurality of images, displayed via a first device, to be used for a set of courses;
receiving, by the system, a selection of a region of the image for a course of the set of courses from the first device;
receiving, by the system, a selection of an activity for the course from the first device, the activity for the course being selected from a group of activities;
receiving, by the system, another selection of a group of user interface tools associated with the activity;
assigning, by the system, a subject area and a set of developmental levels to the course;
establishing, by the system, an educational goal, for a first user identity associated with a second device, based on the activity and first information associated with the first user identity;
establishing, by the system, another educational goal, for a second user identity associated with a third device, based on the activity and second information associated with the second user identity;
generating, by the system, a first interactive illustration for display on a first screen of the second device that facilitates the activity according to the educational goal, wherein the group of user interface tools associated with the other selection is displayed with the first interactive illustration on the first screen of the second device, wherein a position of a user interface tool from the group of user interface tools with respect to the first screen and the first interactive illustration is varied based on input data provided to the second device, and wherein the group of user interface tools is employed for identifying the region via the second device, providing a name for the region via the second device, or providing a description associated with the region via the second device;
generating, by the system, a virtual keyboard for display on a second screen of the second device that is configured as a sensor screen and further facilitates the activity;
generating, by the system, the first interactive illustration for display on a screen of the third device that facilitates the activity according to the other educational goal, wherein the group of user interface tools associated with the other selection is displayed with the first interactive illustration on the screen of the third device, and wherein the group of user interface tools is employed for the identifying the region via the third device, the providing the name for the region via the third device, or the providing the description associated with the region via the third device; and
generating, by the system, a second interactive illustration, based on the image and another activity, for another course of the set of courses, wherein the other course is assigned a disparate subject area.

9. The method of claim 8, further comprising creating, by the system, the activity for an educational terminal to facilitate the satisfying of the educational goal, the activity comprising the identifying the region, the providing the name for the region, or the providing the description associated with the region.

10. The method of claim 8, further comprising:
facilitating a first display of the group of user interface tools via an instructor interface associated with the first device to facilitate the selection of the region; and
facilitating a second display of the group of user interface tools via an educational terminal associated with the second device to facilitate the satisfying of the educational goal.

11. The method of claim 8, further comprising receiving, by the system, a selection of an educational activity selected from a group comprising a historical-cultural studies activity and an art criticism activity.

12. The method of claim 8, further comprising facilitating display of an indicator icon on the first screen of the second device in response to a determination that a selection of the user interface tool from the group of user interface tools satisfies a defined criterion.

13. The method of claim 8, wherein a first developmental level from the set of development levels is customized for the first user identity and a second development level from the set of development levels is customized for the second user identity.

14. The method of claim 13, wherein the first developmental level corresponds to a first educational grade level and the second development level corresponds to a second educational grade level.

15. The method of claim 8, wherein the group of activities comprises a study work activity, a research work activity, and a test work activity.

16. The method of claim 8, further comprising:
receiving data describing a desired subject area, and a desired development level; and
selecting a lesson of the set of lessons comprising an interactive image, based on the desired subject area and the desired development level.

17. A computer readable storage device having instructions stored thereon that, in response to execution by a system comprising a processor, facilitate performance of operations, comprising:
receiving, from an instructor interface associated with a first device, a selection of an image of a plurality of images to facilitate generating a plurality of courses;
receiving, from the instructor interface associated with the first device, a selection of a first activity for identifying an aspect of a first portion of the image for a course, of the plurality of courses, related to the image, the first activity being selected from a group of activities;
receiving, from the instructor interface associated with the first device, another selection of a plurality of user interface instruments;
assigning a subject area for the course;
establishing a first educational goal, for a first student identity associated with a second device, based on the image, the first activity, the subject area, and a first development level associated with the first student identity;
establishing a second educational goal, for a second student identity associated with a third device, based on the image, the first activity, the subject area, and a second development level associated with the second student identity;
initiating, in response to receiving a first indication of a selection of the course by an education terminal, displaying the image on a first sensor screen of the second device and a virtual keyboard on a second sensor screen of a second device to facilitate satisfaction of the first educational goal;
initiating, in response to receiving the first indication of the selection of the course by the education terminal, displaying at least the image and the plurality of user interface instruments associated with the other selection on a sensor screen of the third device to facilitate satisfaction of the second educational goal, wherein the plurality of user interface instruments is employed for the identifying the aspect of the first portion of the image via the third device; and
initiating, in response to receiving a second indication of a selection of a disparate course by the education terminal associated with the second device, displaying at least the image and the plurality of user interface instruments associated with the other selection on the first sensor screen of the second device to facilitate satisfaction of a third educational goal that is based on at least one disparate activity for identifying another aspect of at least a second portion of the image, wherein a position of a user interface instrument from the plurality of user interface instruments with respect to the first sensor screen and the image is varied based on input data provided to the second device, and wherein the plurality of user interface instruments is employed for the identifying the other aspect of at least the second portion of the image via the second device.

18. The computer readable storage device of claim 17, wherein the operations further comprise displaying the image of the plurality of images and the plurality of user interface instruments on a screen of the first device.

19. The computer readable storage device of claim 17, wherein the operations further comprise creating the first activity for the educational terminal associated with the second device to facilitate the satisfaction of the first educational goal.

20. The computer readable storage device of claim 17, wherein the operations further comprise receiving responses related to the activity to facilitate a determination of whether the first educational goal is satisfied.

* * * * *